US012405409B2

(12) United States Patent
Lane et al.

(10) Patent No.: US 12,405,409 B2
(45) Date of Patent: Sep. 2, 2025

(54) CHEMICAL DIFFUSION TREATED VOLUME HOLOGRAMS AND METHODS FOR MAKING THE SAME

(71) Applicant: META PLATFORMS TECHNOLOGIES, LLC, Menlo Park, CA (US)

(72) Inventors: Austin Lane, Sammamish, WA (US); Marvin Dion Alim, Duvall, WA (US); Yang Yang, Redmond, WA (US); Janee Ashley McNeil, Seattle, WA (US)

(73) Assignee: Meta Platforms Technologies, LLC, Menlo Park, CA (US)

( * ) Notice: Subject to any disclaimer, the term of this patent is extended or adjusted under 35 U.S.C. 154(b) by 911 days.

(21) Appl. No.: 17/507,517

(22) Filed: Oct. 21, 2021

(65) Prior Publication Data

US 2022/0155503 A1 May 19, 2022

Related U.S. Application Data

(60) Provisional application No. 63/114,226, filed on Nov. 16, 2020.

(51) Int. Cl.
  *G02B 5/18* (2006.01)
  *G02B 5/32* (2006.01)
  *G03H 1/02* (2006.01)
(52) U.S. Cl.
  CPC ............ *G02B 5/1857* (2013.01); *G02B 5/32* (2013.01); *G03H 1/0248* (2013.01)
(58) Field of Classification Search
  None
  See application file for complete search history.

(56) References Cited

U.S. PATENT DOCUMENTS

| 4,983,003 A | 1/1991 | Wreede et al. |
| 5,024,909 A * | 6/1991 | Smothers ............... G03F 7/027 430/1 |

(Continued)

FOREIGN PATENT DOCUMENTS

| EP | 0370626 A2 | 5/1990 |
| WO | 8603852 A1 | 7/1986 |
| WO | 8605286 A1 | 9/1986 |

OTHER PUBLICATIONS

Ullah, Ramzan, Khan, Salah Ud-Din, Aamir, Muhammad, Ullah, Rasheed, Terahertz Time Domain, Raman and Fourier Transform Infrared Spectroscopy of Acrylamide, and the Application of Density Functional Theory, Journal of Spectroscopy, 2013, 148903, 7 pages, 2013 (Year: 2013).*

(Continued)

*Primary Examiner* — Jonathan Johnson
*Assistant Examiner* — Andrew Preston Traywick
(74) *Attorney, Agent, or Firm* — Greenberg Traurig, LLP

(57) ABSTRACT

A method for making an optical grating having a non-uniform refractive index profile along a direction substantially perpendicular to a plane defined by the optical grating includes placing a layer of photopolymerization material having a first surface and a second surface that is opposite to the first surface between a first material transfer layer and a second material transfer layer so that the first surface of the layer of photopolymerization material is in contact with the first material transfer layer and the second surface of the layer of photopolymerization material is in contact with the second material transfer layer to allow material transfer between the layer of photopolymerization material and the first and second material transfer layers by diffusion.

18 Claims, 15 Drawing Sheets

(56) References Cited

U.S. PATENT DOCUMENTS

| | | | |
|---|---|---|---|
| 5,698,369 | A | 12/1997 | Kawamura et al. |
| 6,319,648 | B1 | 11/2001 | Reiser |
| 6,567,573 | B1 | 5/2003 | Domash et al. |
| 8,257,885 | B1 | 9/2012 | Efimov |
| 10,474,099 | B2* | 11/2019 | Azakami ............... G03H 1/0256 |
| 2006/0147811 | A1 | 7/2006 | Stepanov et al. |
| 2010/0328741 | A1 | 12/2010 | Cheverton et al. |
| 2011/0049864 | A1* | 3/2011 | Menz ....................... G03H 1/18 |
| | | | 156/242 |
| 2011/0236803 | A1 | 9/2011 | Weiser et al. |
| 2015/0131942 | A1 | 5/2015 | Xu et al. |
| 2018/0188689 | A1* | 7/2018 | Ziegler .................. G03H 1/265 |
| 2018/0217312 | A1* | 8/2018 | Hiraoka ................. C08K 5/378 |
| 2019/0207362 | A1 | 7/2019 | Kong et al. |

OTHER PUBLICATIONS

Methyl Thioglycolate, Product Page, Sigma-Aldrich (Year: 2024).*

Methoxystyrene, Technical Datasheet, Scientific Polymer Products, Inc (Year: 2020).*

International Preliminary Report on Patentability for International Application No. PCT/US2021/059548, mailed May 25, 2023, 10 pages.

Chandross E.A., et al., "Photolocking—a New Technique for Fabricating Optical Vaveguide Circuits," Applied Physics Letters, 1974, vol. 24 (2), 4 pages.

International Preliminary Report on Patentability for International Application No. PCT/US2021/055034, mailed Apr. 27, 2023, 11 pages.

International Search Report and Written Opinion for International Application No. PCT/US2021/055034, mailed Mar. 14, 2022, 14 pages.

International Search Report and Written Opinion for International Application No. PCT/US2021/059548, mailed Jul. 4, 2022, 14 pages.

Invitation to Pay Additional Fees for International Application No. PCT/US2021/055034, mailed Jan. 20, 2022, 9 pages.

Invitation to Pay Additional Fees for International Application No. PCT/US2021/059548, mailed May 10, 2022, 8 pages.

Kudo H., et al., "New Large Refractive-Index Change Materials: Synthesis and Photochemical Valence somerization of the Calixarene Derivatives Containing Norbomadiene Moieties," Bulletin of the Chemical Society of Japan, Jul. 9, 2004, vol. 77 (7), pp. 1415-1422.

Murase S., et al., "Large Photoinduced Refractive Index Changes of Transparent Polymer Films Containing Photoeliminable Diazo and Azido Groups," Macromolecules, 1999, vol. 32 (4), pp. 1103-1110.

Zanutta A., et al., "Understanding the Mechanism of Refractive Index Modulation in Materials Undergoing Photocries Rearrangement," Optical Materials, 2013, vol. 35, pp. 2283-2289.

* cited by examiner

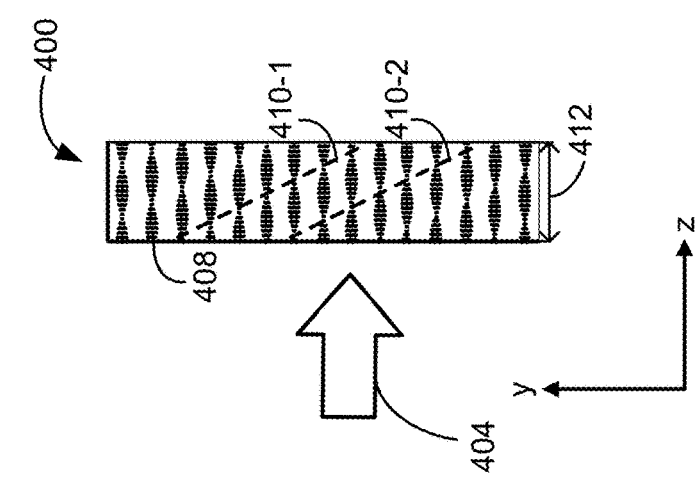
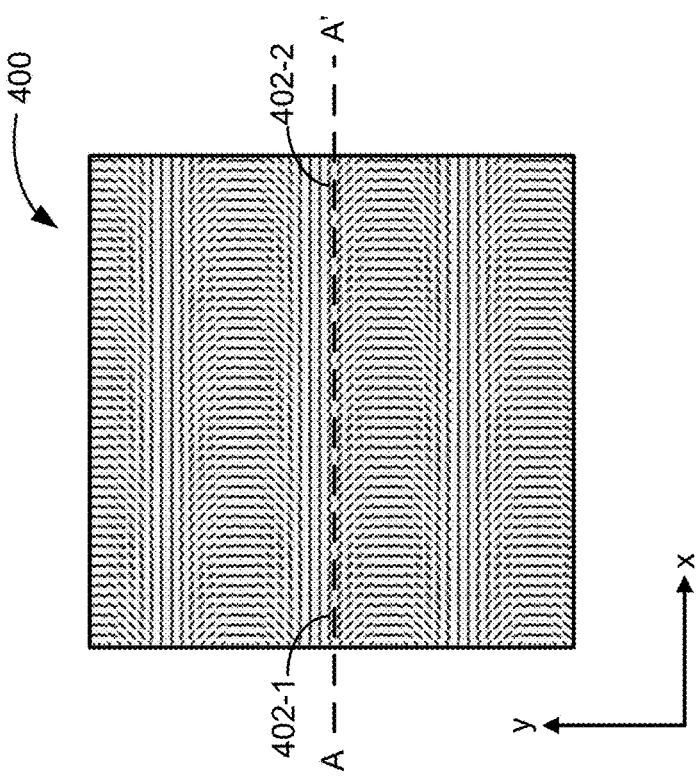
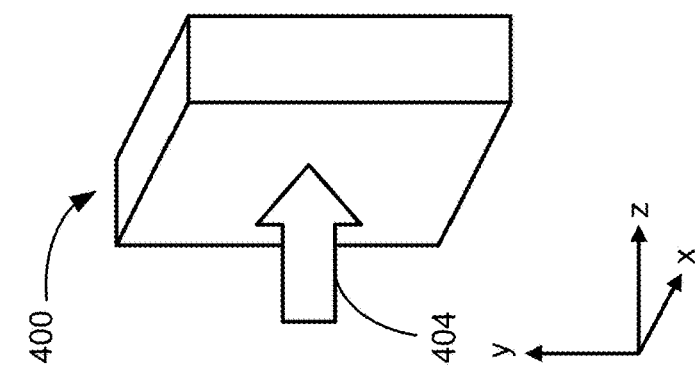
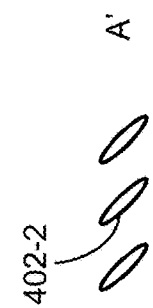
Figure 4A
Figure 4B
Figure 4C
Figure 4D

CHEMICAL DIFFUSION TREATED VOLUME HOLOGRAMS AND METHODS FOR MAKING THE SAME

RELATED APPLICATIONS

This application claims the benefit of, and priority to, U.S. Provisional Patent Application Ser. No. 63/114,226, filed Nov. 16, 2020, which is incorporated by reference herein in its entirety.

TECHNICAL FIELD

The present disclosure relates generally to optical gratings and, more specifically, to chemical diffusion processes used to modify optical properties of the optical gratings.

BACKGROUND

Optical gratings are widely used in various optical devices for causing diffraction of incident light. However, in some configurations, manufacturing optical gratings with certain optical properties may be challenging.

SUMMARY

Accordingly, there is a need for methods for making optical gratings with certain optical properties. An example of such optical properties includes well-defined angular diffraction efficiency. Optical gratings with side lobes in an angular diffraction efficiency curve can lead to crosstalk. When such optical gratings are used for delivering images, the projected images suffer from artifacts. Such artifacts are reduced by the methods described herein.

In accordance with some embodiments, a method for making an optical grating having a non-uniform refractive index profile along a direction substantially perpendicular to a plane defined by the optical grating includes placing a layer of photopolymerization material having a first surface and a second surface that is opposite to the first surface between a first material transfer layer and a second material transfer layer so that the first surface of the layer of photopolymerization material is in contact with the first material transfer layer and the second surface of the layer of photopolymerization material is in contact with the second material transfer layer to allow material transfer between the layer of photopolymerization material and the first and second material transfer layers by diffusion.

In some embodiments, the method includes exposing the layer of photopolymerization material to two beams that overlap with each other over at least a portion of the layer of photopolymerization material to form a volume hologram.

In some embodiments, the method includes polymerizing the layer of photopolymerization material.

In some embodiments, the first material transfer layer and the second material transfer layer include polymerization inhibitors so that the polymerization inhibitors are transferred into the layer of photopolymerization material by diffusion. The layer of photopolymerization material is placed between the first material transfer layer and the second material transfer layer before exposing the layer of photopolymerization material to two beams that overlap with each other over at least a portion of the layer of photopolymerization material to form a volume hologram.

In some embodiments, the polymerization inhibitors include one or more selected from a group consisting of: phenols, nitroxides, benzophenones, or nitrosos. In some embodiments, other inhibitors may be used.

In some embodiments, the method includes removing the first material transfer layer and the second material transfer layer from the layer of photopolymerization material; and exposing the layer of photopolymerization material to the two beams after removing the first material transfer layer and the second material transfer layer from the layer of photopolymerization material.

In some embodiments, the method includes polymerizing the layer of photopolymerization material after exposing the layer of photopolymerization material to the two beams.

In some embodiments, the first material transfer layer and the second material transfer layer include absorptive material so that one or more components of the layer of photopolymerization material are transferred to the first material transfer layer and the second material transfer layer by diffusion.

In some embodiments, the method includes exposing the layer of photopolymerization material to two beams that overlap with each other over at least a portion of the layer of photopolymerization material to form a volume hologram.

In some embodiments, the layer of photopolymerization material is placed between the first material transfer layer and the second material transfer layer before exposing the layer of photopolymerization material to the two beams.

In some embodiments, the layer of photopolymerization material is placed between the first material transfer layer and the second material transfer layer after exposing the layer of photopolymerization material to the two beams.

In some embodiments, the method includes exposing the first surface and the second surface of the layer of photopolymerization material to light before exposing the layer of photopolymerization material to the two beams.

In some embodiments, the method includes polymerizing the layer of photopolymerization material after exposing the layer of photopolymerization material to the two beams.

In some embodiments, the absorptive material includes one or more selected from the group consisting of:

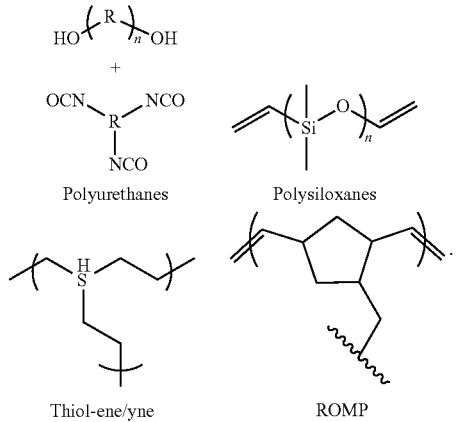

In some other embodiments, other absorptive material may be used.

In some embodiments, the first material transfer layer and the second material transfer layer include a compound having a refractive index that is distinct from a refractive index of the layer of photopolymerization material so that the compound having the predefined refractive index is transferred to the layer of photopolymerization material by diffusion.

In some embodiments, the refractive index of the compound is higher than the refractive index of the layer of photopolymerization material.

In some embodiments, the compound includes one or more selected from the group consisting of:

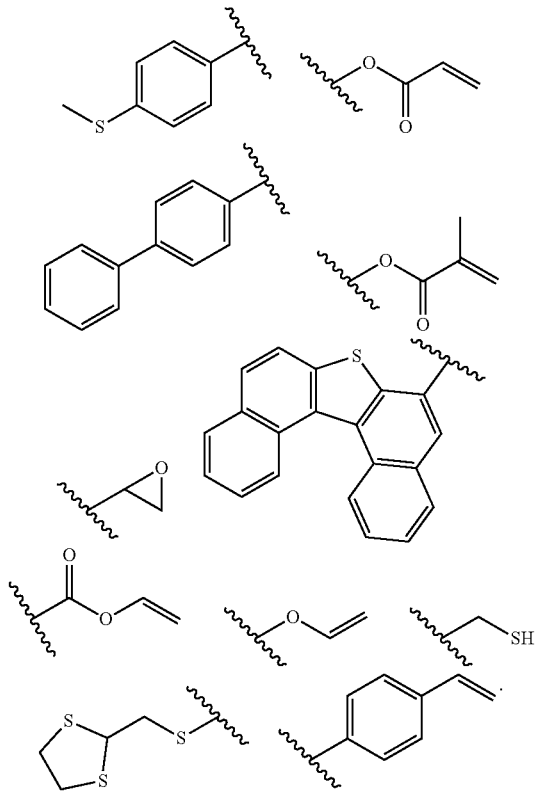

In some embodiments, other compounds that have a high refractive index (e.g., higher than the refractive index of the layer of photopolymerization material) may be used.

In some embodiments, the refractive index of the compound is lower than the refractive index of the layer of photopolymerization material.

In some embodiments, the compound includes one or more selected from the group consisting of:

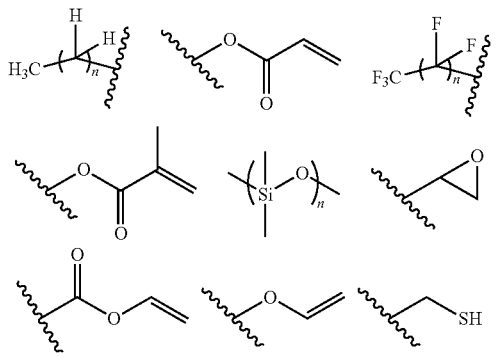

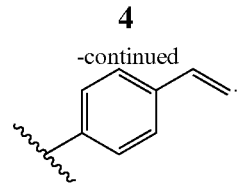

In some embodiments, other compounds that have a low refractive index and one or more polymerizable groups may be used.

In accordance with some embodiments, an optical grating has a non-uniform distribution of one or more chemical species along a direction substantially perpendicular to a plane defined by the optical grating so that the optical grating has a non-uniform refractive index profile along the direction substantially perpendicular to the plane defined by the optical grating.

Such methods and optical gratings made or processed by such methods may replace or complement conventional methods for making optical gratings and optical gratings made by conventional methods.

BRIEF DESCRIPTION OF THE DRAWINGS

For a better understanding of the various described embodiments, reference should be made to the Description of Embodiments below, in conjunction with the following drawings in which like reference numerals refer to corresponding parts throughout the figures.

FIGS. 4A-4D are schematic diagrams illustrating a polarization selective grating in accordance with some embodiments.

These figures are not drawn to scale unless indicated otherwise.

DETAILED DESCRIPTION

Accordingly, there is a need for methods for making optical gratings with certain optical properties. An example of such optical properties includes well-defined angular diffraction efficiency. Optical gratings with side lobes in an angular diffraction efficiency curve can lead to crosstalks. When such optical gratings are used for delivering images, the projected images suffer from artifacts.

Described herein are methods for making, or processing, optical gratings so that their side peaks are suppressed. When such optical gratings are used for delivering images, the projected images have no or reduced optical artifacts. Thus, such optical gratings may be used in image optics, and may be used in head-mounted displays for virtual reality and/or augmented reality operations.

Reference will now be made to embodiments, examples of which are illustrated in the accompanying drawings. In the following description, numerous specific details are set forth in order to provide an understanding of the various described embodiments. However, it will be apparent to one of ordinary skill in the art that the various described embodiments may be practiced without these specific details. In other instances, well-known methods, procedures, components, circuits, and networks have not been described in detail so as not to unnecessarily obscure aspects of the embodiments.

Figure 1A:
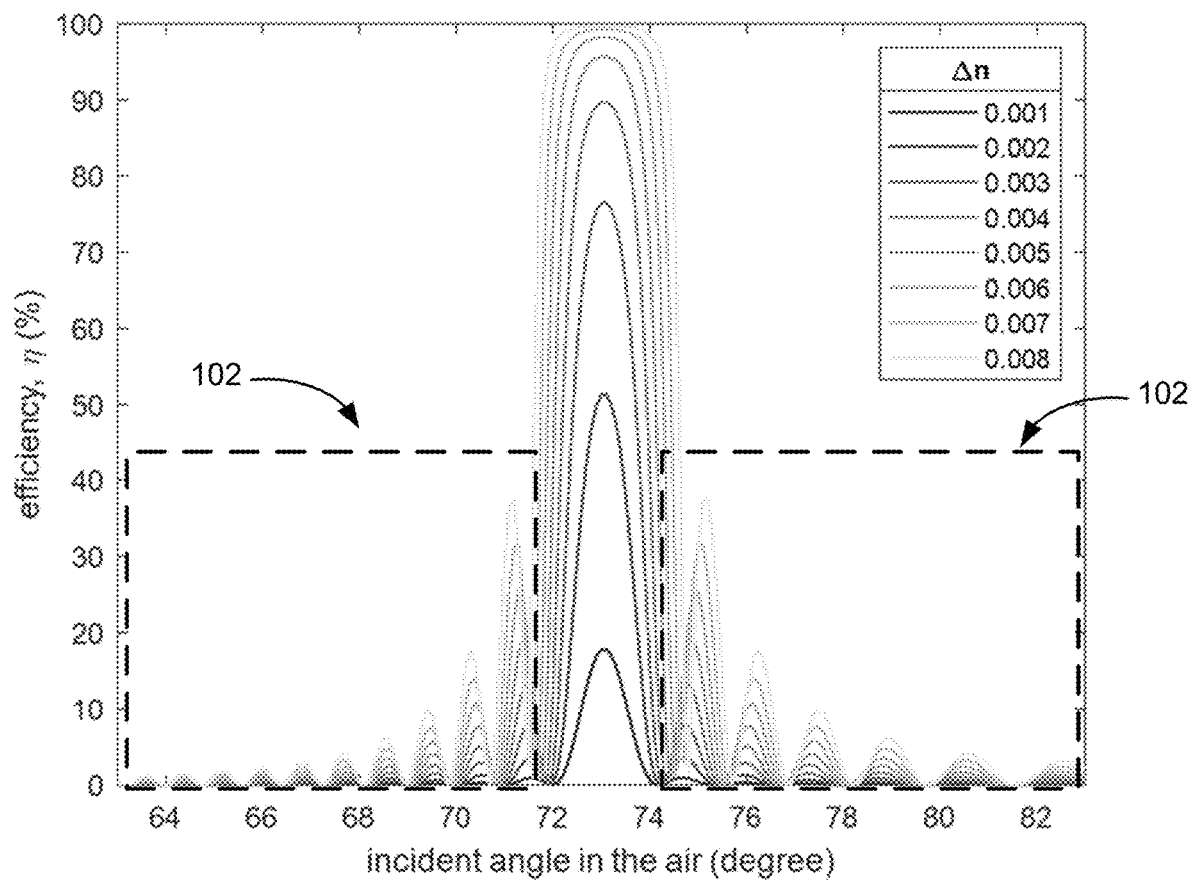
FIG. 1A shows an example grating efficiency as a function of an incident angle in accordance with some embodiments.

FIG. 1A shows an example grating efficiency (also called a diffraction efficiency) of a reflective grating (e.g., a reflective volume Bragg grating) as a function of an incident angle in accordance with some embodiments. As shown in FIG. 1A, the grating efficiency curve typically has a main peak, corresponding to a selected angle of incidence, and side peaks 102 (also called side-lobes). As explained below, the side peaks may lower the performance of, or introduce artifacts in, optical devices with such gratings, especially when such gratings are used with a large field-of-view and/or a large eyebox. Thus, in some configurations, it is beneficial to reduce or eliminate the side peaks (e.g., relative to the main peak).

Figure 1B:
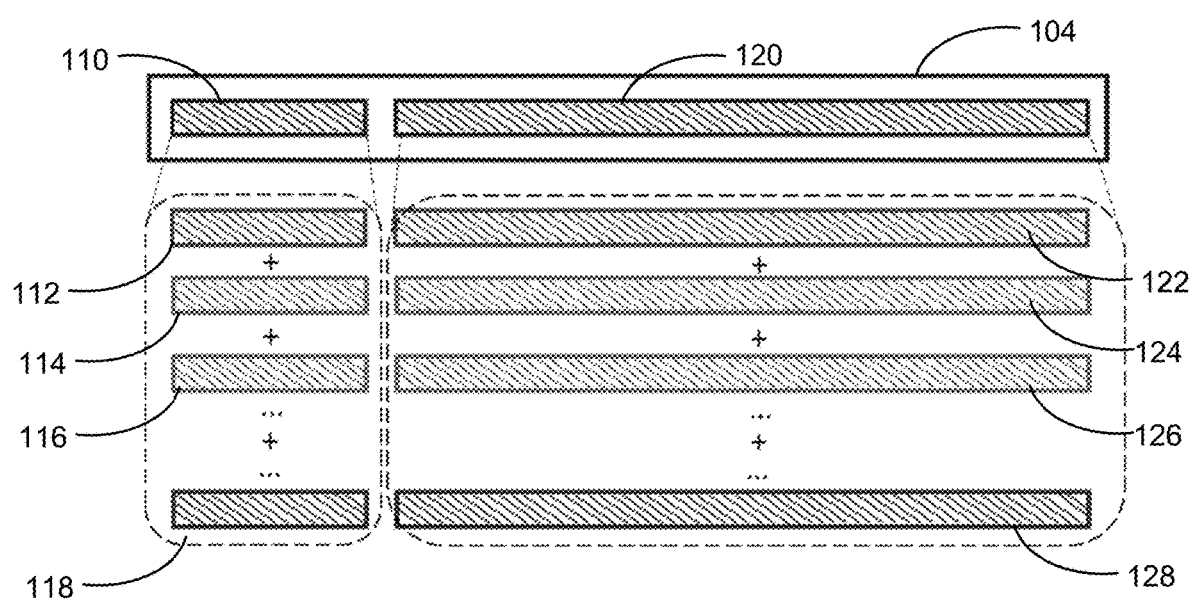
FIG. 1B is a schematic diagram illustrating an optical waveguide with multiplexed volume Bragg gratings in accordance with some embodiments.

FIG. 1B is a schematic diagram illustrating an optical waveguide 104 with multiplexed volume Bragg gratings 110 and 120 in accordance with some embodiments. In some configurations, multiplexed volume Bragg grating 110 operates as an input coupler (e.g., receiving and redirecting light incident on the optical waveguide 104 for subsequent propagation along the optical waveguide 104 via total internal reflection), and multiplexed volume Bragg grating 120 operates as an output coupler (e.g., receiving and redirecting light having propagated within the optical waveguide 104 so that the light exits the optical waveguide 104). In some configurations, each of the multiplexed volume Bragg gratings 110 and 120 is a stack of volume Bragg gratings, each configured to interact with light within a respective wavelength range and/or a respective range of incident angles (e.g., multiplexed volume Bragg grating 110 is a stack of volume Bragg gratings 112, 114, 116, and 118 and multiplexed volume Bragg grating 120 is a stack of volume Bragg gratings 122, 124, 126, and 128). Alternatively, each of multiplexed volume Bragg gratings 110 and 120 is configured to operate as a stack of multiple volume Bragg gratings (e.g., by superposing the grating patterns of the multiple volume Bragg gratings) without physically stacking the multiple volume Bragg gratings. In some embodiments, volume Bragg gratings 112 and 122 have a corresponding diffraction angle (e.g., a first diffraction angle), volume Bragg gratings 114 and 124 have a corresponding diffraction angle (e.g., a second diffraction angle different from the first diffraction angle), volume Bragg gratings 116 and 126 have a corresponding diffraction angle (e.g., a third diffraction angle different from the first and second diffraction angles), and volume Bragg gratings 118 and 128 have a corresponding diffraction angle (e.g., a fourth diffraction angle different from the first, second, and third diffraction angles).

Figure 1C:
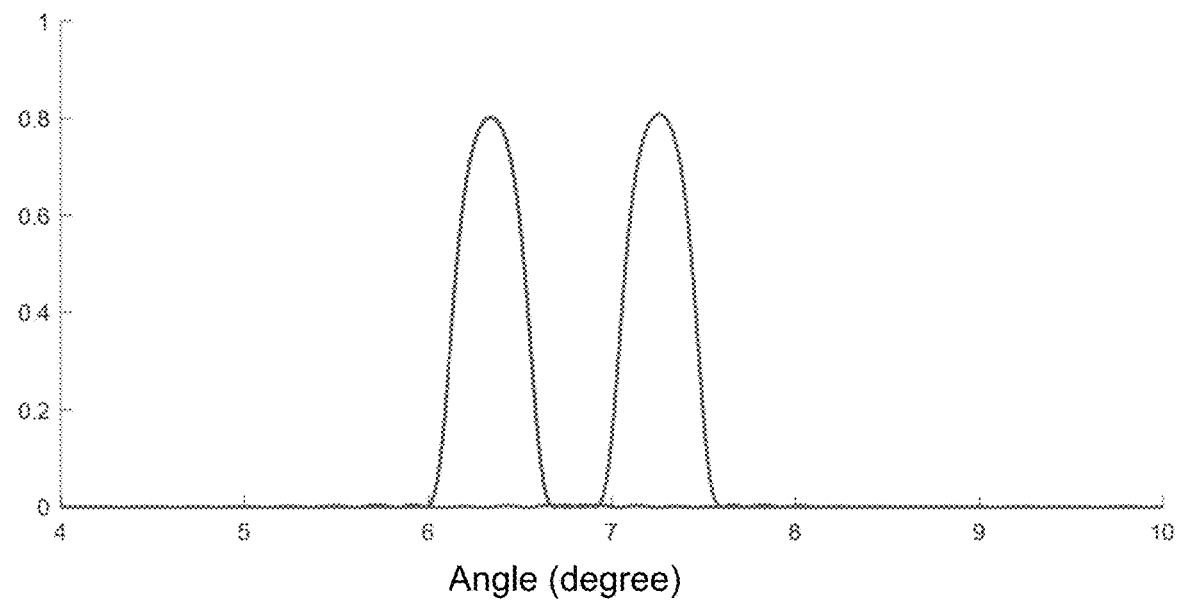
FIG. 1C shows example grating efficiency curves of two gratings that do not overlap with each other.
Figure 1D:
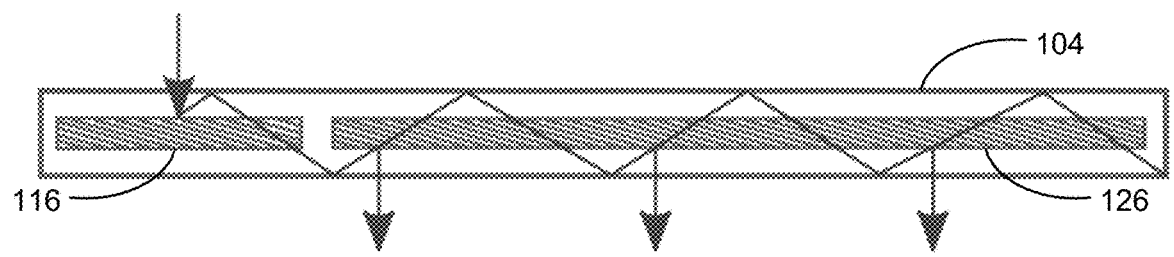
FIG. 1D is a schematic diagram illustrating an example path of light propagating through the two gratings represented by FIG. 1C.

In configurations with non-overlapping grating efficiency curves as shown in FIG. 1C, there is no crosstalk between volume Bragg gratings configured for different ranges of incident angles, as shown in FIG. 1D. For example, light steered by volume Bragg grating 116 (or a corresponding component of the multiplexed volume Bragg grating 110) propagates within the optical waveguide 104, and is subsequently redirected by corresponding volume Bragg grating 126 (or a corresponding component of the multiplex volume Bragg grating 120). The redirected light exits the optical waveguide 104 in a preselected direction (e.g., a direction perpendicular to the optical waveguide 104).

Figure 1E:
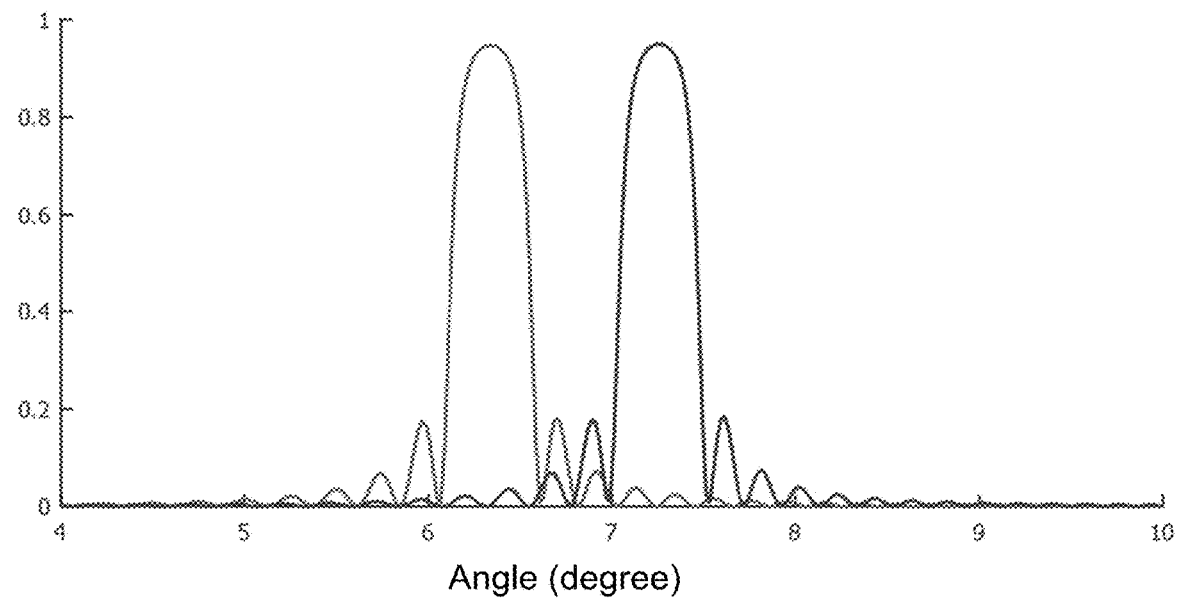
FIG. 1E shows example grating efficiency curves of two gratings that partly overlap with each other.
Figure 1F:
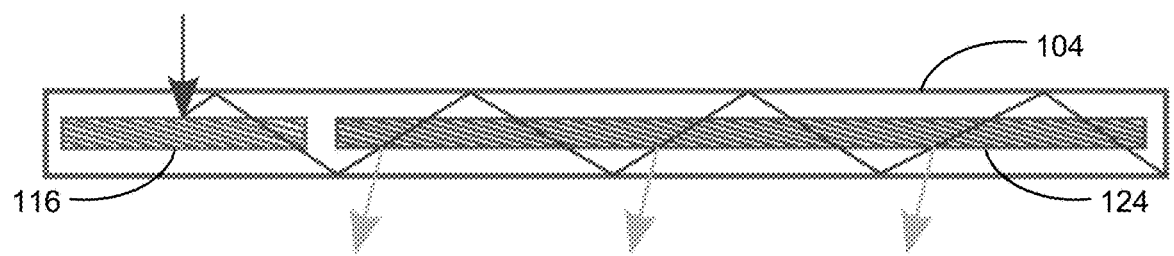
FIG. 1F is a schematic diagram illustrating an example path of light propagating through the two gratings represented by FIG. 1E.

However, in configurations with overlapping grating efficiency curves as shown in FIG. 1E, there is a crosstalk between volume Bragg gratings configured for different ranges of incident angles, as shown in FIG. 1F. For example, light steered by volume Bragg grating 116 (or a corresponding component of the multiplexed volume Bragg grating 110) propagates within the optical waveguide 104, and at least a portion of the light is subsequently redirected by volume Bragg grating 124 (or a component of the multiplex volume Bragg grating 120 corresponding to volume Bragg grating 124) due to crosstalk. The redirected light exits the optical waveguide 104 in a direction different from the preselected direction (e.g., a direction that is non-perpendicular to the optical waveguide 104), resulting in optical artifacts (e.g., blurring or ghost images).

Figure 2:
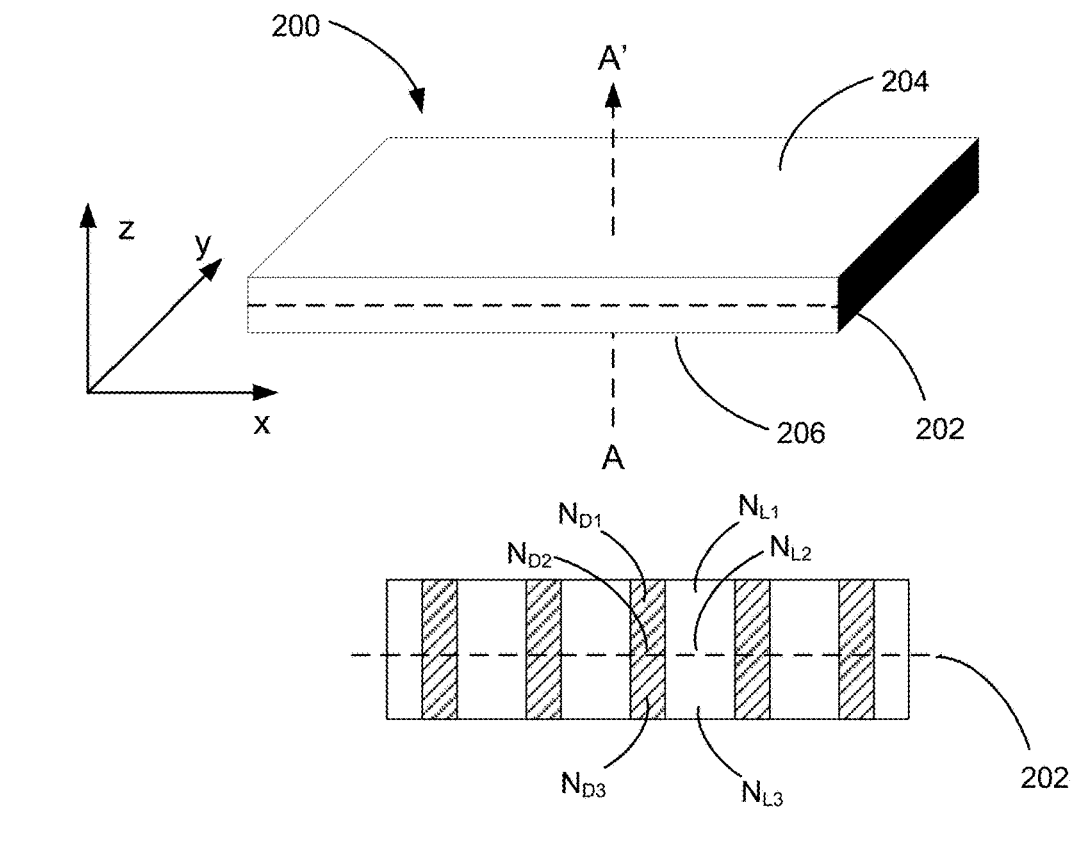
FIG. 2 shows an example refractive index modulation in accordance with some embodiments.
Figure 2:
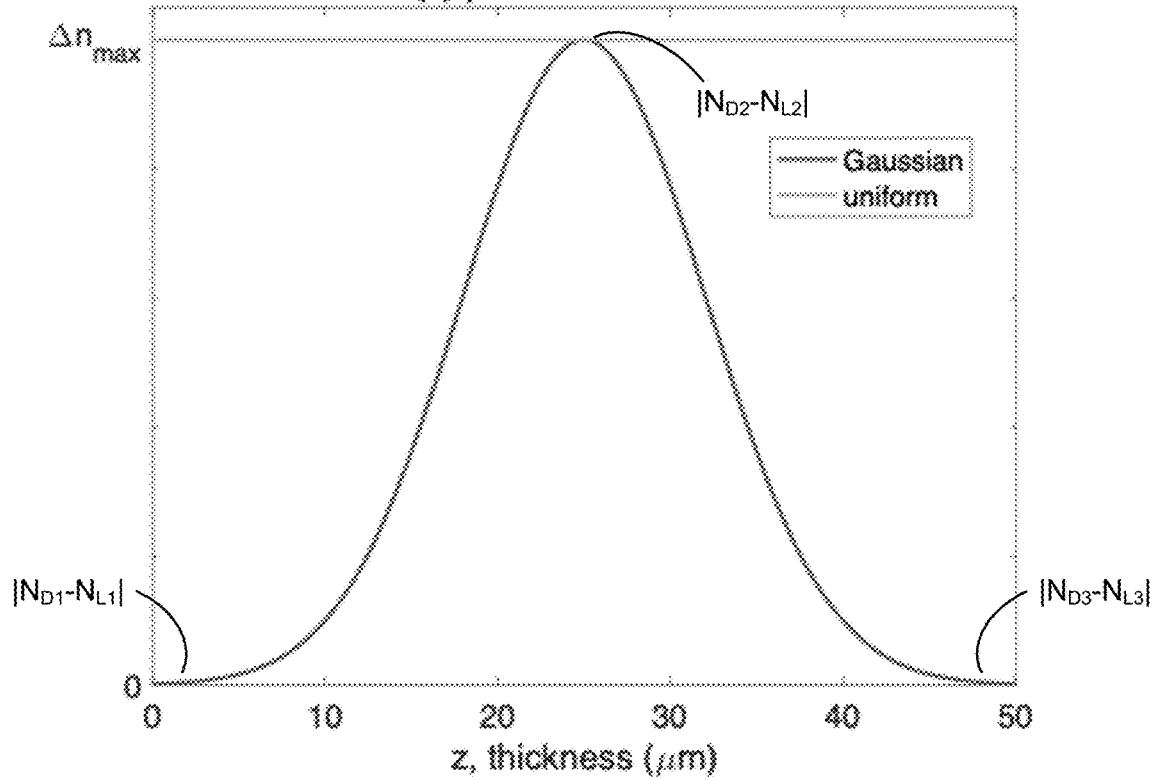

Such optical artifacts, caused by the crosstalk between optical gratings, may be reduced by suppressing the side peaks (relative to the main peak) in the grating efficiency curve. While conventional optical gratings have a uniform refractive index difference in a thickness direction (e.g., a z-direction along line AA' shown in FIG. 2), optical gratings with a non-uniform refractive index difference in the thickness direction have lower side peaks relative to the main peak, thereby having less cross talk between optical gratings. Optical gratings have grating fringes defined by alternating high refractive index regions (shaded regions) and low refractive index regions (non-shaded regions). Conventional optical gratings have a similar refractive index (e.g., a common high refractive index) along the thickness of the high refractive index region (e.g., the refractive indices $N_{D1}$, $N_{D2}$, and $N_{D3}$ are substantially similar) and also a similar refractive index (e.g., a common low refractive index) along the thickness of the low refractive index region (e.g., the refractive indices $N_{L1}$, $N_{L2}$, and $N_{L3}$ are substantially similar). Thus, the refractive index difference between the high refractive index region and the low refractive index region (e.g., $N_{D1}-N_{L1}$, $N_{D2}-N_{L2}$, and $N_{D3}-N_{L3}$) along the thickness direction is substantially the same. In comparison, the refractive index is modified so that the resulting refractive index difference in the thickness direction is non-uniform (e.g., $N_{D2}-N_{L2}$ is different from $N_{D1}-N_{L1}$ or $N_{D3}-N_{L3}$). For example, a portion of the optical grating located adjacent to a middle plane 202 of the optical grating, located between a top surface 204 and a bottom surface 206 of the optical grating, may have a higher refractive index difference than portions of the optical grating located adjacent to the top surface 204 or the bottom surface 206 of the optical grating 200 (e.g., $N_{D2}-N_{L2}>N_{D1}-N_{L1}$ and $N_{D2}-N_{L2}>N_{D3}-N_{L3}$). In some configurations, the refractive index difference has a Gaussian profile.

At the same time, optical gratings with non-uniform base refractive index profile in the thickness direction also have from the side peaks. For example, an optical grating, in which $N_{D1}-N_{L1}=N_{D2}-N_{L2}=N_{D3}-N_{L3}$, where $N_{D2}>N_{D1}$ and $N_{D2}>N_{D1}$, has significant side peaks that contribute to cross talks between optical gratings. Thus, doping the top surface 204 and the bottom surface 206 of the optical grating 200 to increase or decrease the overall refractive index of portions of the optical grating 200 adjacent to the top surface 204 and the bottom surface 206 may not suppress the side peaks.

Figure 3A:
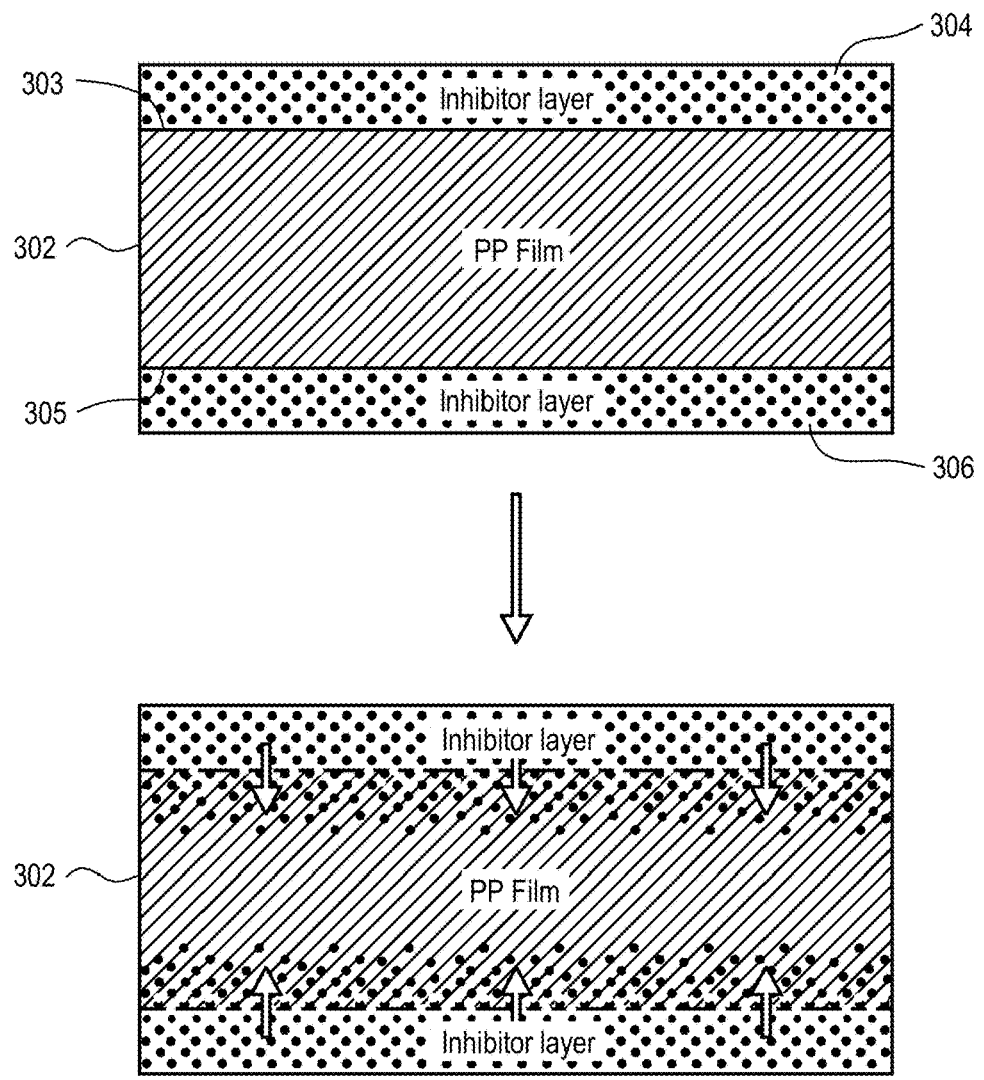
FIG. 3A illustrates a method for modifying the refractive index for an optical grating with inhibitor layers in accordance with some embodiments.
Figure 3B:
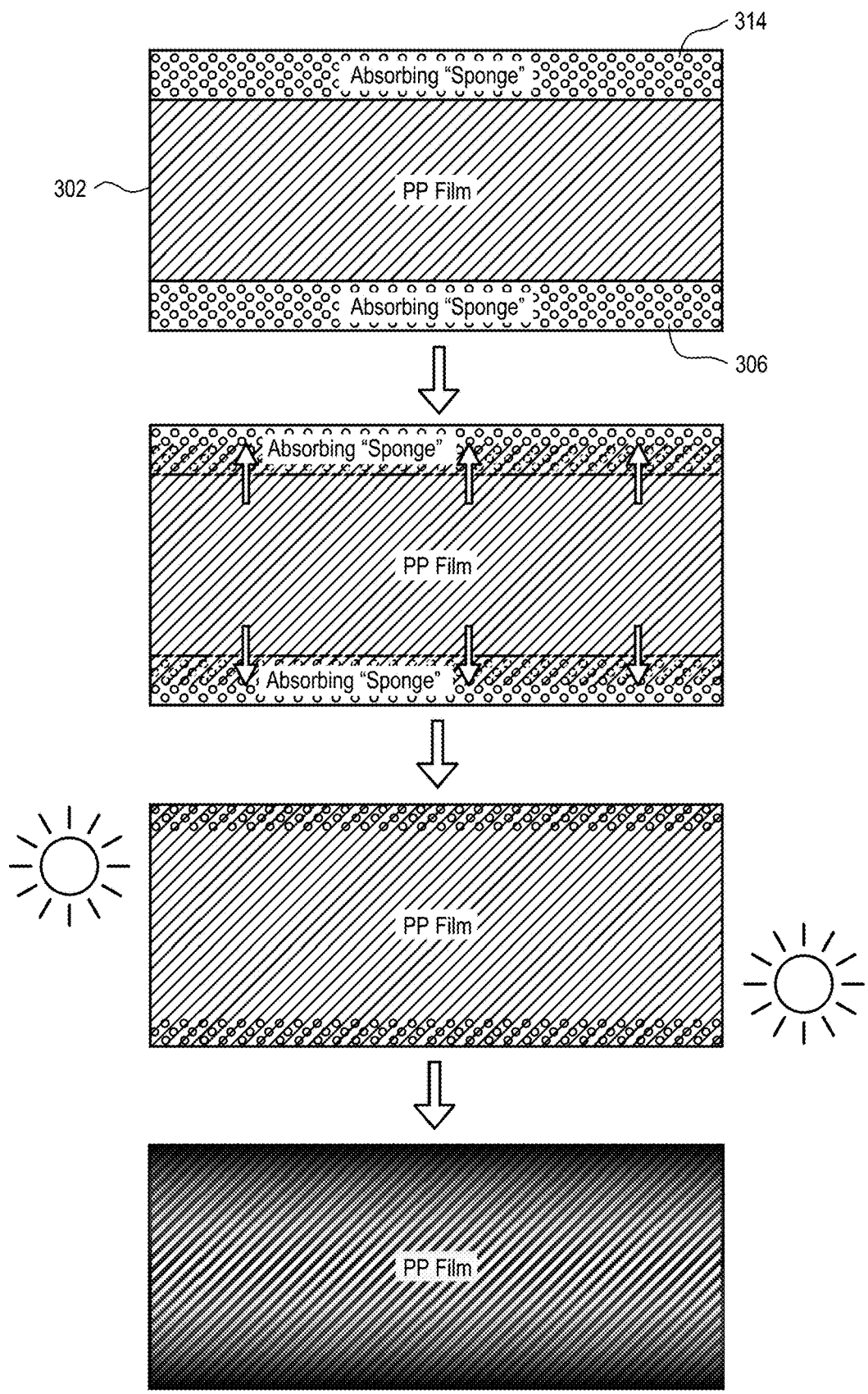
FIG. 3B illustrates a method for modifying the refractive index for an optical grating with absorptive layers in accordance with some embodiments.
Figure 3C:
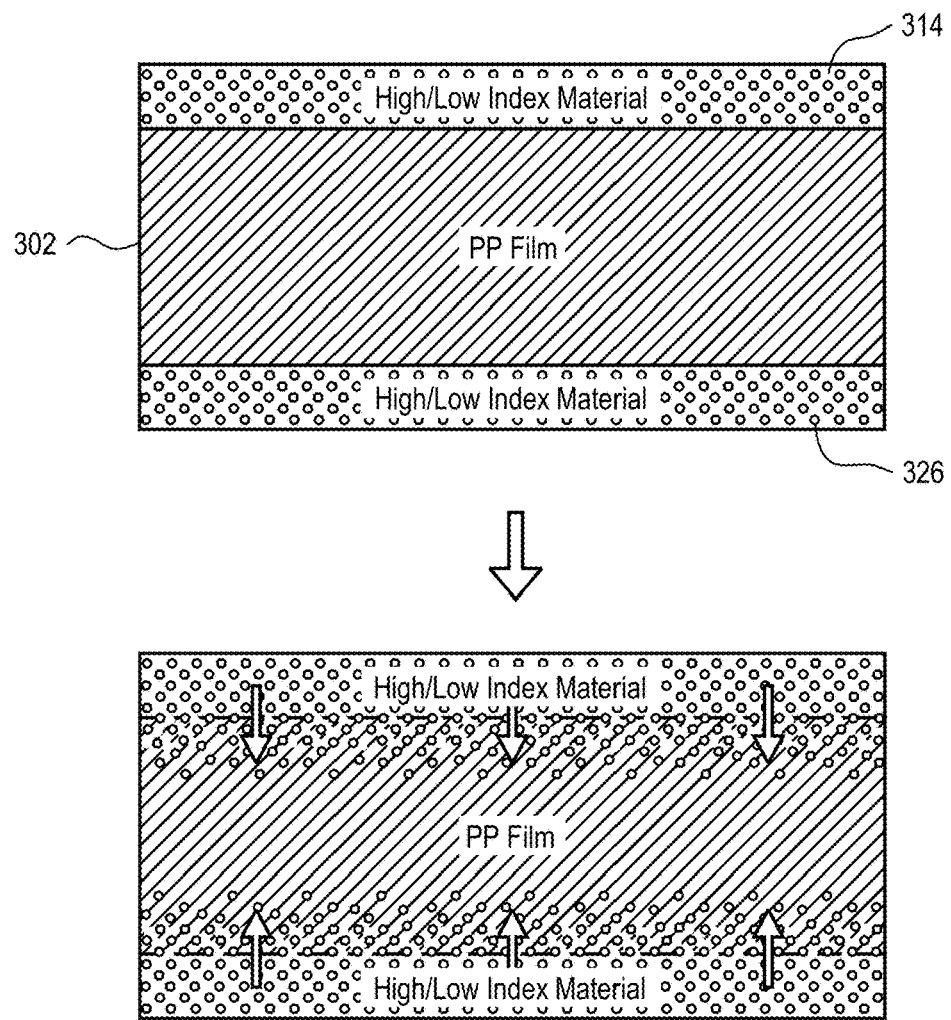
FIG. 3C illustrates a method for modifying the refractive index for an optical grating with layers including compounds of a different refractive index in accordance with some embodiments.

Non-uniform refractive index difference without non-uniform base refractive index profile may be obtained by utilizing diffusion process, examples of which are described with respect to FIGS. 3A-3C. Such methods include obtaining a layer 302 of photopolymerization material having a first surface 303 and a second surface 305 that is opposite to the first surface 303 and placing the layer 302 of photopolymerization material between a first material transfer layer and a second material transfer layer so that the first surface 303 of the layer 302 of photopolymerization material is in contact with the first material transfer layer and the second surface 305 of the layer 302 of photopolymerization material is in contact with the second material transfer layer to allow material transfer between the layer 302 of photopolymerization material and the first and second material transfer layers by diffusion.

Polymeric substrates used as holographic recording media, including for example photosensitive polymer films, are known. See, e.g., Smothers et al., "Photopolymers for Holography," SPIE OE/Laser Conference, 1212-03, Los Angeles, Calif., 1990. The holographic recording media described in this article contain a photoimageable system containing a liquid monomer material (the photoactive monomer) and a photoinitiator (which promotes the polymerization of the monomer upon exposure to light), where the photoimageable system is in an organic polymer host matrix that is substantially inert to the exposure light. During writing (recording) of information into the material (by passing recording light through an array representing data), the monomer polymerizes in the exposed regions. Due to the lowering of the monomer concentration caused by the polymerization, monomer from the dark, unexposed regions of the material diffuses to the exposed regions. See, e.g., Colburn and Haines, "Volume Hologram Formation in Photopolymer Materials," Appl. Opt. 10, 1636-1641, 1971. The polymerization and resulting diffusion create a refractive index change, referred to as Δn, thus forming the hologram (holographic grating) representing the data.

Chain length and degree of polymerization are usually maximized and driven to completion in photopolymer systems used in conventional applications such as coatings, sealants, adhesives, etc., usually by using high light intensities, multifunctional monomers, high concentrations of monomers, heat, etc. Similar approaches were used in holographic recording media known in the art by using organic photopolymer formulations high in monomer concentration. See, for example, U.S. Pat. Nos. 5,874,187 and 5,759,721, disclosing "one-component" organic photopolymer systems, which are incorporated by reference herein in their entireties.

In some embodiments, the "two-component" organic photopolymer systems are used. See, for example, U.S. Pat. Nos. 6,103,454 and 6,482,551, which are incorporated by reference herein in their entireties. Two-component organic photopolymer systems allow for more uniform starting conditions (e.g., regarding the recording process), more convenient processing and packaging options, and the ability to obtain higher dynamic range media with less shrinkage or Bragg detuning.

FIG. 3A illustrates a method for modifying the refractive index for an optical grating with inhibitor layers in accordance with some embodiments.

In FIG. 3A, the first and second material transfer layers are inhibitor layers 304 and 306 that include polymerization inhibitors so that the polymerization inhibitors are transferred into the layer 302 of photopolymerization material by diffusion.

In some embodiments, polymerization materials can include single or two-stage acrylate photopolymers in a low refractive index matrix, usually a polyurethane. These materials may contain other additives, which enhance the refractive index contrast after exposure, including low index counterdiffusant compounds. For example, inhibitor layers 304 and 306 may include a solid matrix saturated with polymerization inhibitors. The diffusion may be a pure liquid-phase diffusion process, or a vapor-phase diffusion process, which would cause minimal base index change in the layer 302 of photopolymerization material.

In some embodiments, the polymerization inhibitors include one or more selected from a group consisting of phenols, nitroxides, benzoquinones, nitrosos, phenothiazines, or their derivatives (e.g., amino-2,2,6,6-tetramethylpiperidine-1-oxyl, hydroxy-2,2,6,6-tetramethylpiperidine-1-oxyl, etc.). In some embodiments, other inhibitors may be used.

Figure 3D:
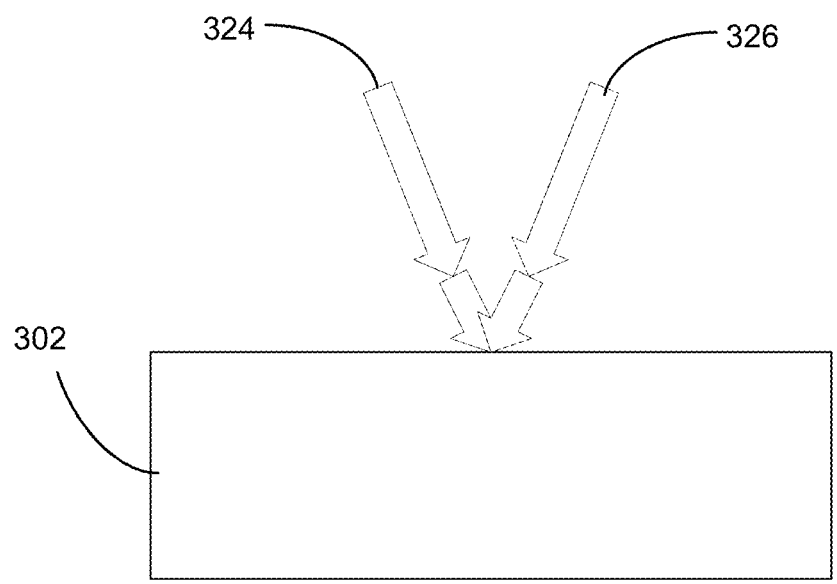
FIG. 3D is a schematic diagram illustrating a holographic exposure using two beams in accordance with some embodiments.

As explained above, the layer 302 of photopolymerization material is placed between the first material transfer layer (e.g., the inhibitor layer 304) and the second material transfer layer (e.g., the inhibitor layer 306). After the polymerization inhibitors are diffused into the layer 302 of photopolymerization material, the layer 302 of photopolymerization material (with or without the inhibitor layers 304 and 306) is exposed to two beams 334 and 336 that overlap with each other over at least a portion of the layer 302 of photopolymerization material to form a volume hologram, as shown in FIG. 3D, so that grating fringes are formed in the layer 302 of photopolymerization material. In some embodiments, the two beams 334 and 336 are coherent light (typically split from a common coherent light source, such as a laser) so the two beams 334 and 336 form interference fringes when the two beams 334 and 336 overlap each other. In some embodiments, the layer 302 of photopolymerization material is polymerized (e.g., cured by heat or exposure to light, such as ultraviolet light).

FIG. 3B illustrates a method for modifying the refractive index for an optical grating with absorptive layers in accordance with some embodiments.

In FIG. 3B, the first material transfer layer and the second material transfer layer are absorptive layers 314 and 316 that include absorptive material so that one or more components (e.g., monomers, photosensitizers, or other writing chemistry components) of the layer 302 of photopolymerization material are transferred to the first material transfer layer and the second material transfer layer by diffusion. When the one or more components of the layer 302 of photopolymerization film are depleted from the top and bottom surfaces of the layer 302 of photopolymerization material, the refractive index difference of portions of the layer 302 of photopolymerization material located adjacent to the absorptive layers 314 and 316 is reduced. The diffusion may be a solvent-based diffusion process. For example, the absorptive layers 314 and 316 may include a solid matrix saturated with a solvent in which the one or more components are soluble. In some embodiments, such diffusion process is performed before or after holographic exposure (described with respect to FIG. 3D).

In some embodiments, the absorptive material includes one or more of: polyurethanes, polysiloxanes, thiol-enes, thiol-ynes, or ring opening metathesis polymers (ROMP):

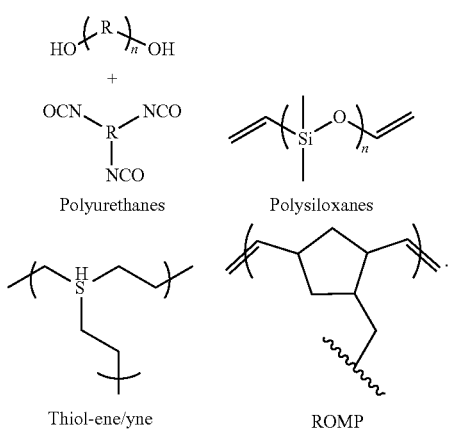

In some other embodiments, other absorptive material may be used.

In some embodiments, the absorptive material (e.g., a matrix material) has a glass temperature ($T_g$) at or below room temperature to enable relatively fast diffusion. In some embodiments, the one or more components have a good solubility in the matrix material so that such compounds may have a relatively fast diffusion in or out of the matrix material.

In some embodiments, when the depletion of the one or more components lead to a reduction in the base refractive index in the regions adjacent to the top and bottom surfaces of the layer 302 of photopolymerization material, after the diffusion process, the layer 302 of photopolymerization material is (pre-)exposed to light to increase the refractive index of the regions adjacent to the top and bottom surfaces of the layer 302 of photopolymerization material so that the layer 302 of photopolymerization material has a more uniform base refractive index along the thickness direction. Even though the base refractive index is increased in the regions adjacent to the top and bottom surfaces of the layer 302 of photopolymerization material, the refractive index difference does not increase in the regions adjacent to the top and bottom surfaces of the layer 302 of photopolymerization material as the one or more components used for forming the grating fringes are consumed by the pre-exposure.

FIG. 3C illustrates a method for modifying the refractive index for an optical grating with layers including compounds of a different refractive index in accordance with some embodiments.

In FIG. 3C, the first and second material transfer layers 324 and 326 include a compound having a predefined refractive index that is distinct from a refractive index of the layer 302 of photopolymerization material so that the compound having the predefined refractive index is transferred to the layer 302 of photopolymerization material by diffusion. For example, the first and second material transfer layers 324 and 326 may include a solid matrix saturated with the compound with the predefined refractive index. The diffusion may be a liquid-phase diffusion process, or a vapor-phase diffusion process. In some embodiments, such diffusion process is performed before or after holographic exposure (described with respect to FIG. 3D).

In some embodiments, the compound is a high refractive index compound having one or more moieties selected from:

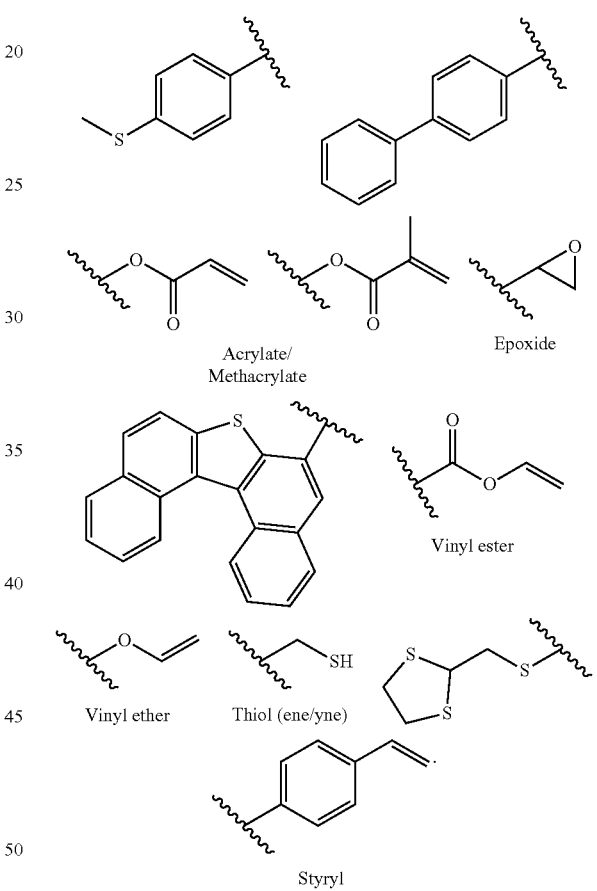

In some embodiments, the compound is a low refractive index compound having one or more moieties selected from:

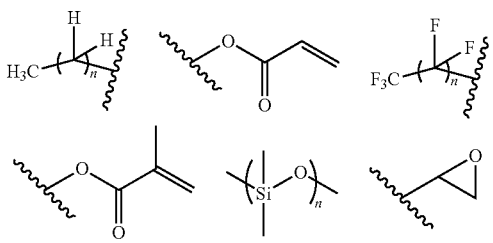

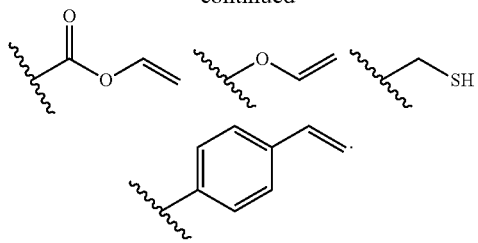

In some embodiments, one or more of the methods described with respect to FIGS. 3A-3C are combined (e.g., the method described with respect to FIG. 3A may be applied to a layer 302 of photopolymerization material before or after the method described with respect to FIG. 3C is applied the layer 302 of photopolymerization material).

Figure 3E:
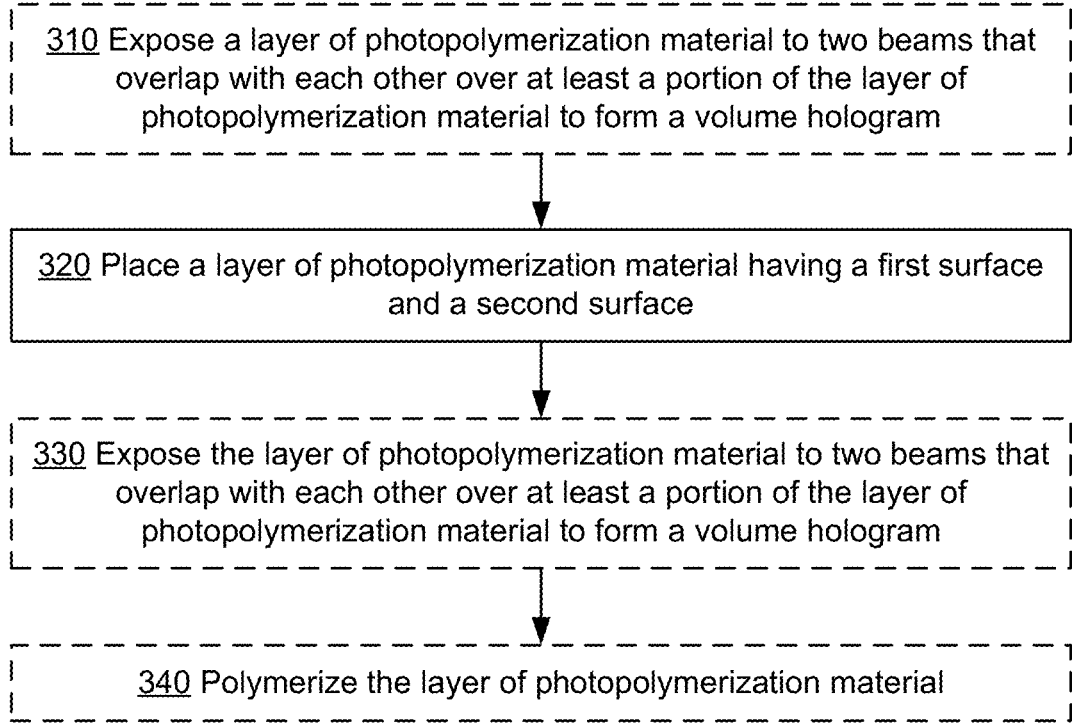
FIG. 3E is a flow diagram illustrating a method of modifying a layer of photopolymerization material in accordance with some embodiments.

FIG. 3E is a flow diagram illustrating a method of modifying a layer of photopolymerization material in accordance with some embodiments.

The method includes (320) placing a layer of photopolymerization material having a first surface and a second surface that is opposite to the first surface between a first material transfer layer and a second material transfer layer so that the first surface of the layer of photopolymerization material is in contact with the first material transfer layer and the second surface of the layer of photopolymerization material is in contact with the second material transfer layer to allow material transfer between the layer of photopolymerization material and the first and second material transfer layers by diffusion.

In some embodiments, the method includes exposing the layer of photopolymerization material to two beams that overlap with each other over at least a portion of the layer of photopolymerization material to form a volume hologram. In some embodiments, the layer of photopolymerization material is exposed to the two beams (310) before the first surface of the layer of photopolymerization material is in contact with the first material transfer layer and the second surface of the layer of photopolymerization material is in contact with the second material transfer layer. In some embodiments, the layer of photopolymerization material is exposed to the two beams (330) after the first surface of the layer of photopolymerization material is in contact with the first material transfer layer and the second surface of the layer of photopolymerization material is in contact with the second material transfer layer.

In some embodiments, the method includes (340) polymerizing the layer of photopolymerization material.

FIGS. 4A-4D are schematic diagrams illustrating polarization selective grating 400 in accordance with some embodiments. In some embodiments, the polarization selective grating 400 is formed, or processed, by the exposure described with respect to FIG. 3D. FIG. 4A illustrates a three dimensional view of polarization selective grating 400 with incoming light 404 entering the lens along the z-axis. FIG. 4B illustrates an x-y-plane view of polarization selective grating 400 with a plurality of organic crystals (e.g., organic crystals 402-1 and 402-2) with various orientations. In contrast to polarization selective lens 300 described above with respect to FIG. 3B, the orientations (e.g., azimuthal angles θ) of the organic crystals are constant along reference line between B and B' along the x-axis, as shown in FIG. 4D illustrating a detailed plane view of the organic crystals along the reference line. The orientations of the organic crystals in FIG. 4B vary along the y-axis. In case of a grating, the pitch defined as a distance along the y-axis at which the azimuth angle of an organic crystal has rotated 360 degrees may be constant throughout the grating. FIG. 4C illustrates a y-z-cross-sectional view of polarization selective grating 400. Polarization selective grating 400 has helical structures 408 with helical axes aligned corresponding to the z-axis. The helical structures create a volume grating with a plurality of diffraction planes (e.g., planes 410-1 and 410-2). In FIG. 4C, diffraction planes 410-1 and 410-2 are tilted with respect to the z-axis. As explained above with respect FIG. 3C, helical structures 408 define the polarization selectivity of polarization selective grating 400, as light with circular polarization handedness corresponding to the helical axes is diffracted while light with circular polarization with the opposite handedness is not diffracted. Helical structures 408 also define the wavelength selectivity of polarization selective grating 400, as light with wavelength close to a helical pitch (e.g., helical pitch 412 in FIG. 4C) is diffracted while light with other wavelengths is not diffracted.

In some embodiments, optical gratings that include the layer of photopolymerization material with a non-uniform refractive index difference profile along the thickness direction may be used in display devices such as head-mounted display devices. In some embodiments, such optical gratings may be implemented as multifunctional optical components in near-eye displays for augmented reality ("AR"), virtual reality ("VR"), and/or mixed reality ("MR"). For example, such optical gratings may be implemented in waveguide-based combiners, eye-tracking components, display resolution enhancement components, pupil steering elements, and polarization controlling components (e.g., a quarter-wave plate or a half-wave plate), etc., which may significantly reduce the weight and size, and enhance the optical performance of the head-mounted display devices. Exemplary embodiments of head-mounted display devices with an optical grating are described with respect to FIGS. 5-7.

Figure 5:
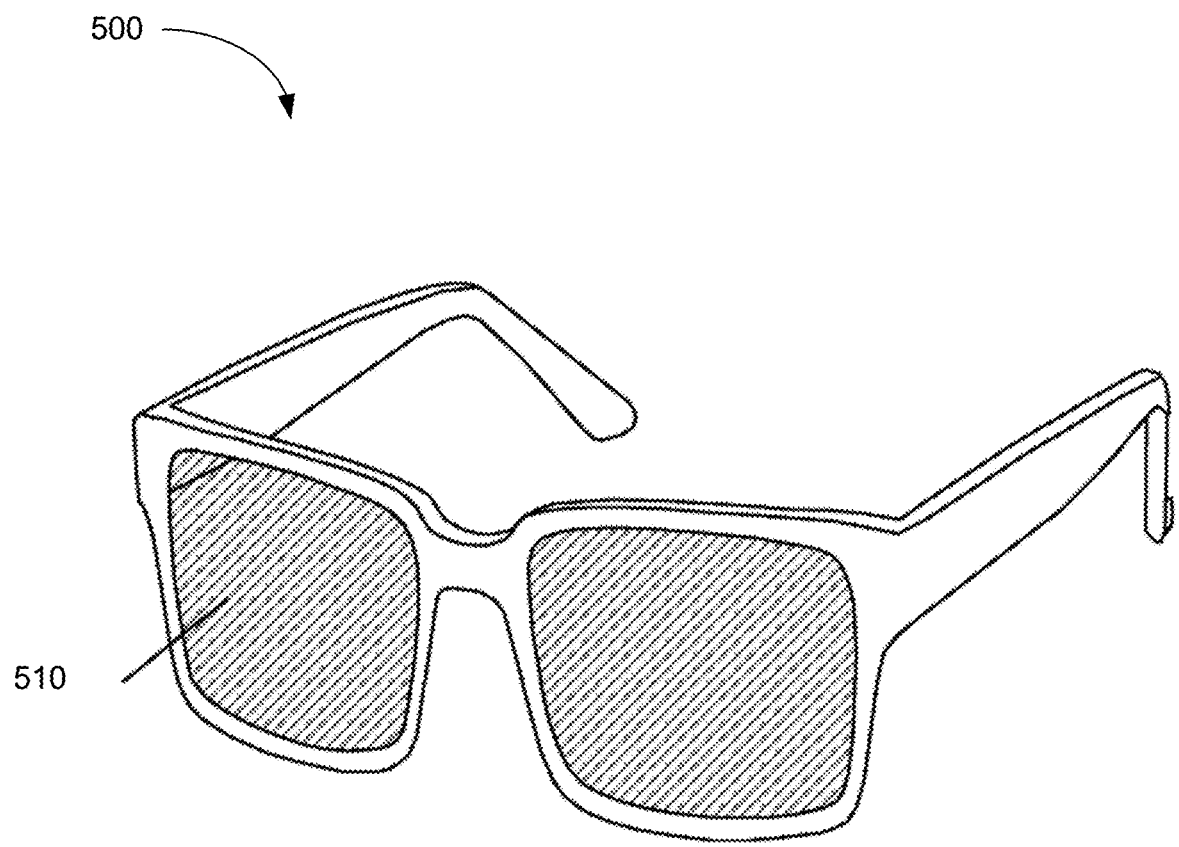
FIG. 5 is a perspective view of a display device in accordance with some embodiments.

FIG. 5 illustrates display device 500 in accordance with some embodiments. In some embodiments, display device 500 is configured to be worn on a head of a user (e.g., by having the form of spectacles or eyeglasses, as shown in FIG. 5) or to be included as part of a helmet that is to be worn by the user. When display device 500 is configured to be worn on a head of a user or to be included as part of a helmet, display device 500 is called a head-mounted display. Alternatively, display device 500 is configured for placement in proximity of an eye or eyes of the user at a fixed location, without being head-mounted (e.g., display device 500 is mounted in a vehicle, such as a car or an airplane, for placement in front of an eye or eyes of the user). As shown in FIG. 5, display device 500 includes display 510. Display 510 is configured for presenting visual contents (e.g., augmented reality contents, virtual reality contents, mixed reality contents, or any combination thereof) to a user.

Figure 6:
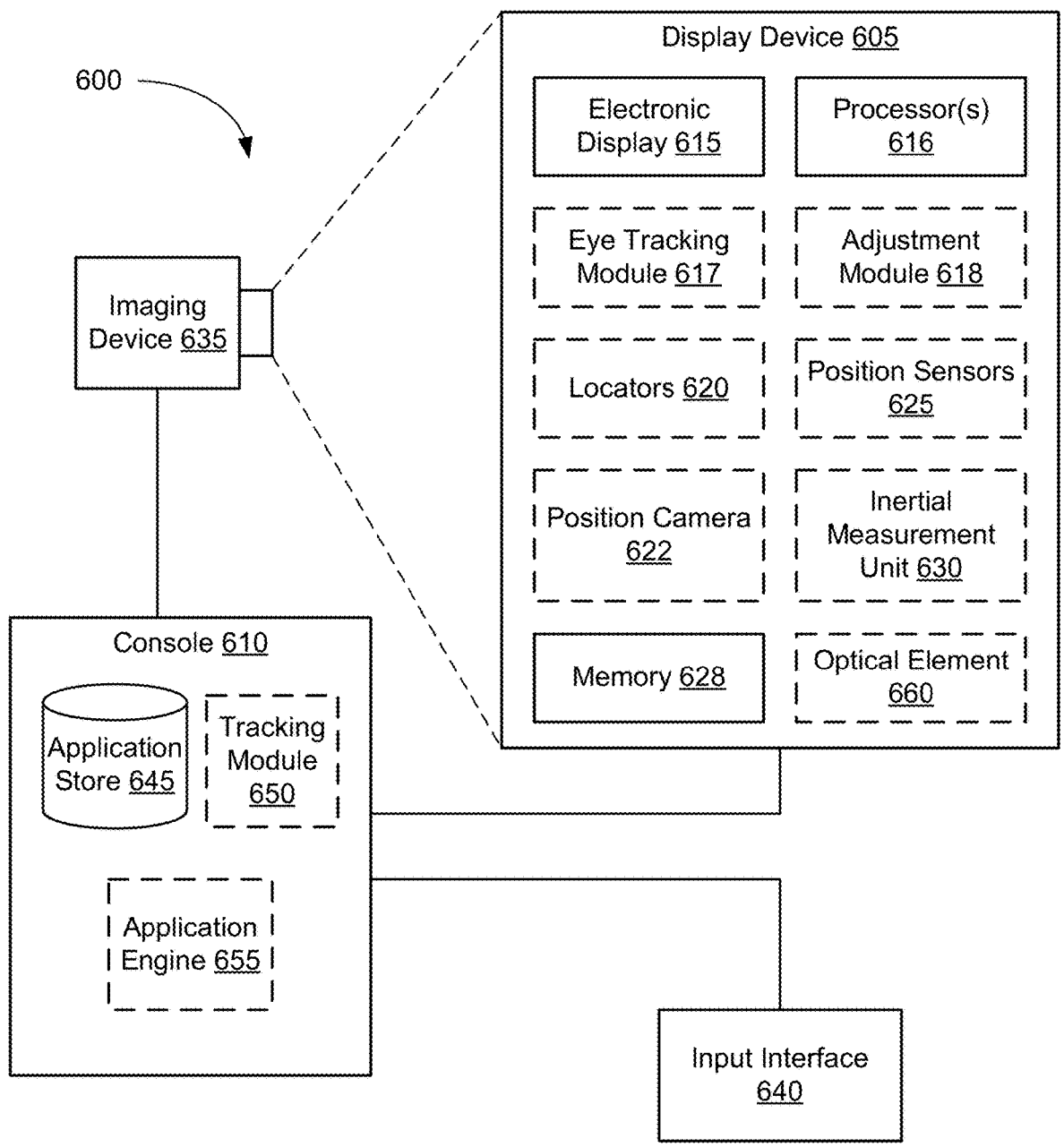
FIG. 6 is a block diagram of a system including a display device in accordance with some embodiments.

In some embodiments, display device 500 includes one or more components described herein with respect to FIG. 6. In some embodiments, display device 500 includes additional components not shown in FIG. 6.

FIG. 6 is a block diagram of system 600 in accordance with some embodiments. The system 600 shown in FIG. 6 includes display device 605 (which corresponds to display device 500 shown in FIG. 5), imaging device 635, and input interface 640 that are each coupled to console 610. While FIG. 6 shows an example of system 600 including one display device 605, imaging device 635, and input interface 640, in other embodiments, any number of these components may be included in system 600. For example, there may be multiple display devices 605 each having associated input interface 640 and being monitored by one or more imaging devices 635, with each display device 605, input interface 640, and imaging devices 635 communicating with console 610. In alternative configurations, different and/or additional components may be included in system 600. For example, in some embodiments, console 610 is connected via a network (e.g., the Internet or a wireless network) to system 600 or is self-contained as part of display device 605 (e.g., physically located inside display device 605). In some embodiments, display device 605 is used to create mixed reality by adding in a view of the real surroundings. Thus, display device 605 and system 600 described here can deliver augmented reality, virtual reality, and mixed reality.

In some embodiments, as shown in FIG. 5, display device 605 is a head-mounted display that presents media to a user. Examples of media presented by display device 605 include one or more images, video, audio, or some combination thereof. In some embodiments, audio is presented via an external device (e.g., speakers and/or headphones) that receives audio information from display device 605, console 610, or both, and presents audio data based on the audio information. In some embodiments, display device 605 immerses a user in an augmented environment.

In some embodiments, display device 605 also acts as an augmented reality (AR) headset. In these embodiments, display device 605 augments views of a physical, real-world environment with computer-generated elements (e.g., images, video, sound, etc.). Moreover, in some embodiments, display device 605 is able to cycle between different types of operation. Thus, display device 605 operate as a virtual reality (VR) device, an augmented reality (AR) device, as glasses or some combination thereof (e.g., glasses with no optical correction, glasses optically corrected for the user, sunglasses, or some combination thereof) based on instructions from application engine 655.

Display device 605 includes electronic display 615, one or more processors 616, eye tracking module 617, adjustment module 618, one or more locators 620, one or more position sensors 625, one or more position cameras 622, memory 628, inertial measurement unit (IMU) 630, one or more optical elements 660 or a subset or superset thereof (e.g., display device 605 with electronic display 615, one or more processors 616, and memory 628, without any other listed components). Some embodiments of display device 605 have different modules than those described here. Similarly, the functions can be distributed among the modules in a different manner than is described here.

One or more processors 616 (e.g., processing units or cores) execute instructions stored in memory 628. Memory 628 includes high-speed random access memory, such as DRAM, SRAM, DDR RAM or other random access solid state memory devices; and may include non-volatile memory, such as one or more magnetic disk storage devices, optical disk storage devices, flash memory devices, or other non-volatile solid state storage devices. Memory 628, or alternately the non-volatile memory device(s) within memory 628, includes a non-transitory computer readable storage medium. In some embodiments, memory 628 or the computer readable storage medium of memory 628 stores programs, modules and data structures, and/or instructions for displaying one or more images on electronic display 615.

Electronic display 615 displays images to the user in accordance with data received from console 610 and/or processor(s) 616. In various embodiments, electronic display 615 may comprise a single adjustable display element or multiple adjustable display elements (e.g., a display for each eye of a user). In some embodiments, electronic display 615 is configured to display images to the user by projecting the images onto one or more optical elements 660.

In some embodiments, the display element includes one or more light emission devices and a corresponding array of spatial light modulators. A spatial light modulator is an array of electro-optic pixels, opto-electronic pixels, some other array of devices that dynamically adjust the amount of light transmitted by each device, or some combination thereof. These pixels are placed behind one or more lenses. In some embodiments, the spatial light modulator is an array of liquid crystal based pixels in an LCD (a Liquid Crystal Display). Examples of the light emission devices include: an organic light emitting diode, an active-matrix organic light-emitting diode, a light emitting diode, some type of device capable of being placed in a flexible display, or some combination thereof. The light emission devices include devices that are capable of generating visible light (e.g., red, green, blue, etc.) used for image generation. The spatial light modulator is configured to selectively attenuate individual light emission devices, groups of light emission devices, or some combination thereof. Alternatively, when the light emission devices are configured to selectively attenuate individual emission devices and/or groups of light emission devices, the display element includes an array of such light emission devices without a separate emission intensity array. In some embodiments, electronic display 615 projects images to one or more optical elements 660, which reflect at least a portion of the light toward an eye of a user.

One or more lenses direct light from the arrays of light emission devices (optionally through the emission intensity arrays) to locations within each eyebox and ultimately to the back of the user's retina(s). An eyebox is a region that is occupied by an eye of a user located proximity to display device 605 (e.g., a user wearing display device 605) for viewing images from display device 605. In some cases, the eyebox is represented as a 10 mm×10 mm square. In some embodiments, the one or more lenses include one or more coatings, such as anti-reflective coatings.

In some embodiments, the display element includes an infrared (IR) detector array that detects IR light that is retro-reflected from the retinas of a viewing user, from the surface of the corneas, lenses of the eyes, or some combination thereof. The IR detector array includes an IR sensor or a plurality of IR sensors that each correspond to a different position of a pupil of the viewing user's eye. In alternate embodiments, other eye tracking systems may also be employed. As used herein, IR refers to light with wavelengths ranging from 700 nm to 1 mm including near infrared (NIR) ranging from 750 nm to 1500 nm.

Eye tracking module 617 determines locations of each pupil of a user's eyes. In some embodiments, eye tracking module 617 instructs electronic display 615 to illuminate the eyebox with IR light (e.g., via IR emission devices in the display element).

A portion of the emitted IR light will pass through the viewing user's pupil and be retro-reflected from the retina toward the IR detector array, which is used for determining the location of the pupil. Alternatively, the reflection off of the surfaces of the eye is used to also determine location of the pupil. The IR detector array scans for retro-reflection and identifies which IR emission devices are active when retro-reflection is detected. Eye tracking module 617 may use a tracking lookup table and the identified IR emission devices to determine the pupil locations for each eye. The tracking lookup table maps received signals on the IR detector array to locations (corresponding to pupil locations) in each eyebox. In some embodiments, the tracking lookup table is generated via a calibration procedure (e.g., user looks at various known reference points in an image and eye tracking module 617 maps the locations of the user's pupil while looking at the reference points to corresponding signals received on the IR tracking array). As mentioned above, in some embodiments, system 600 may use other eye tracking systems than the embedded IR one described herein.

Adjustment module 618 generates an image frame based on the determined locations of the pupils. In some embodiments, this sends a discrete image to the display that will tile subimages together thus a coherent stitched image will appear on the back of the retina. Adjustment module 618 adjusts an output (i.e. the generated image frame) of electronic display 615 based on the detected locations of the pupils. Adjustment module 618 instructs portions of electronic display 615 to pass image light to the determined locations of the pupils. In some embodiments, adjustment module 618 also instructs the electronic display to not pass image light to positions other than the determined locations of the pupils. Adjustment module 618 may, for example, block and/or stop light emission devices whose image light falls outside of the determined pupil locations, allow other light emission devices to emit image light that falls within the determined pupil locations, translate and/or rotate one or more display elements, dynamically adjust curvature and/or refractive power of one or more active lenses in the lens (e.g., microlens) arrays, or some combination thereof.

Optional locators 620 are objects located in specific positions on display device 605 relative to one another and relative to a specific reference point on display device 605. A locator 620 may be a light emitting diode (LED), a corner cube reflector, a reflective marker, a type of light source that contrasts with an environment in which display device 605 operates, or some combination thereof. In embodiments where locators 620 are active (e.g., an LED or other type of light emitting device), locators 620 may emit light in the visible band (e.g., about 500 nm to 750 nm), in the infrared band (e.g., about 750 nm to 1 mm), in the ultraviolet band (about 100 nm to 500 nm), some other portion of the electromagnetic spectrum, or some combination thereof.

In some embodiments, locators 620 are located beneath an outer surface of display device 605, which is transparent to the wavelengths of light emitted or reflected by locators 620 or is thin enough to not substantially attenuate the wavelengths of light emitted or reflected by locators 620. Additionally, in some embodiments, the outer surface or other portions of display device 605 are opaque in the visible band of wavelengths of light. Thus, locators 620 may emit light in the IR band under an outer surface that is transparent in the IR band but opaque in the visible band.

IMU 630 is an electronic device that generates calibration data based on measurement signals received from one or more position sensors 625. Position sensor 625 generates one or more measurement signals in response to motion of display device 605. Examples of position sensors 625 include: one or more accelerometers, one or more gyroscopes, one or more magnetometers, another suitable type of sensor that detects motion, a type of sensor used for error correction of IMU 630, or some combination thereof. Position sensors 625 may be located external to IMU 630, internal to IMU 630, or some combination thereof.

Based on the one or more measurement signals from one or more position sensors 625, IMU 630 generates first calibration data indicating an estimated position of display device 605 relative to an initial position of display device 605. For example, position sensors 625 include multiple accelerometers to measure translational motion (forward/back, up/down, left/right) and multiple gyroscopes to measure rotational motion (e.g., pitch, yaw, roll). In some embodiments, IMU 630 rapidly samples the measurement signals and calculates the estimated position of display device 605 from the sampled data. For example, IMU 630 integrates the measurement signals received from the accelerometers over time to estimate a velocity vector and integrates the velocity vector over time to determine an estimated position of a reference point on display device 605. Alternatively, IMU 630 provides the sampled measurement signals to console 610, which determines the first calibration data. The reference point is a point that may be used to describe the position of display device 605. While the reference point may generally be defined as a point in space; however, in practice the reference point is defined as a point within display device 605 (e.g., a center of IMU 630).

In some embodiments, IMU 630 receives one or more calibration parameters from console 610. As further discussed below, the one or more calibration parameters are used to maintain tracking of display device 605. Based on a received calibration parameter, IMU 630 may adjust one or more IMU parameters (e.g., sample rate). In some embodiments, certain calibration parameters cause IMU 630 to update an initial position of the reference point so it corresponds to a next calibrated position of the reference point. Updating the initial position of the reference point as the next calibrated position of the reference point helps reduce accumulated error associated with the determined estimated position. The accumulated error, also referred to as drift error, causes the estimated position of the reference point to "drift" away from the actual position of the reference point over time.

Imaging device 635 generates calibration data in accordance with calibration parameters received from console 610. Calibration data includes one or more images showing observed positions of locators 620 that are detectable by imaging device 635. In some embodiments, imaging device 635 includes one or more still cameras, one or more video cameras, any other device capable of capturing images including one or more locators 620, or some combination thereof. Additionally, imaging device 635 may include one or more filters (e.g., used to increase signal to noise ratio). Imaging device 635 is configured to optionally detect light emitted or reflected from locators 620 in a field of view of imaging device 635. In embodiments where locators 620 include passive elements (e.g., a retroreflector), imaging device 635 may include a light source that illuminates some or all of locators 620, which retro-reflect the light towards the light source in imaging device 635. Second calibration data is communicated from imaging device 635 to console 610, and imaging device 635 receives one or more calibration parameters from console 610 to adjust one or more imaging parameters (e.g., focal length, focus, frame rate, ISO, sensor temperature, shutter speed, aperture, etc.).

In some embodiments, display device 605 optionally includes one or more optical elements 660 (e.g., lenses, reflectors, gratings, etc.). In some embodiments, electronic display device 605 includes a single optical element 660 or multiple optical elements 660 (e.g., an optical element 660 for each eye of a user). In some embodiments, electronic display 615 projects computer-generated images on one or more optical elements 660, such as a reflective element, which, in turn, reflect the images toward an eye or eyes of a user. The computer-generated images include still images, animated images, and/or a combination thereof. The computer-generated images include objects that appear to be two-dimensional and/or three-dimensional objects. In some embodiments, one or more optical elements 660 are partially transparent (e.g., the one or more optical elements 660 have a transmittance of at least 15%, 20%, 25%, 30%, 35%, 40%, 45%, 50%, 55%, or 50%), which allows transmission of ambient light. In such embodiments, computer-generated images projected by electronic display 615 are superimposed with the transmitted ambient light (e.g., transmitted ambient image) to provide augmented reality images. In some embodiments, optical elements 660 include optical gratings described herein.

Input interface 640 is a device that allows a user to send action requests to console 610. An action request is a request to perform a particular action. For example, an action request may be to start or end an application or to perform a particular action within the application. Input interface 640 may include one or more input devices. Example input devices include: a keyboard, a mouse, a game controller, data from brain signals, data from other parts of the human body, or any other suitable device for receiving action requests and communicating the received action requests to console 610. An action request received by input interface 640 is communicated to console 610, which performs an action corresponding to the action request. In some embodiments, input interface 640 may provide haptic feedback to the user in accordance with instructions received from console 610. For example, haptic feedback is provided when an action request is received, or console 610 communicates instructions to input interface 640 causing input interface 640 to generate haptic feedback when console 610 performs an action.

Console 610 provides media to display device 605 for presentation to the user in accordance with information received from one or more of: imaging device 635, display device 605, and input interface 640. In the example shown in FIG. 6, console 610 includes application store 645, tracking module 650, and application engine 655. Some embodiments of console 610 have different modules than those described in conjunction with FIG. 6. Similarly, the functions further described herein may be distributed among components of console 610 in a different manner than is described here.

When application store 645 is included in console 610, application store 645 stores one or more applications for execution by console 610. An application is a group of instructions, that when executed by a processor, is used for generating content for presentation to the user. Content generated by the processor based on an application may be in response to inputs received from the user via movement of display device 605 or input interface 640. Examples of applications include: gaming applications, conferencing applications, video playback application, or other suitable applications.

When tracking module 650 is included in console 610, tracking module 650 calibrates system 600 using one or more calibration parameters and may adjust one or more calibration parameters to reduce error in determination of the position of display device 605. For example, tracking module 650 adjusts the focus of imaging device 635 to obtain a more accurate position for observed locators on display device 605. Moreover, calibration performed by tracking module 650 also accounts for information received from IMU 630. Additionally, if tracking of display device 605 is lost (e.g., imaging device 635 loses line of sight of at least a threshold number of locators 620), tracking module 650 re-calibrates some or all of system 600.

In some embodiments, tracking module 650 tracks movements of display device 605 using second calibration data from imaging device 635. For example, tracking module 650 determines positions of a reference point of display device 605 using observed locators from the second calibration data and a model of display device 605. In some embodiments, tracking module 650 also determines positions of a reference point of display device 605 using position information from the first calibration data. Additionally, in some embodiments, tracking module 650 may use portions of the first calibration data, the second calibration data, or some combination thereof, to predict a future location of display device 605. Tracking module 650 provides the estimated or predicted future position of display device 605 to application engine 655.

Application engine 655 executes applications within system 600 and receives position information, acceleration information, velocity information, predicted future positions, or some combination thereof of display device 605 from tracking module 650. Based on the received information, application engine 655 determines content to provide to display device 605 for presentation to the user. For example, if the received information indicates that the user has looked to the left, application engine 655 generates content for display device 605 that mirrors the user's movement in an augmented environment. Additionally, application engine 655 performs an action within an application executing on console 610 in response to an action request received from input interface 640 and provides feedback to the user that the action was performed. The provided feedback may be visual or audible feedback via display device 605 or haptic feedback via input interface 640.

Figure 7A:
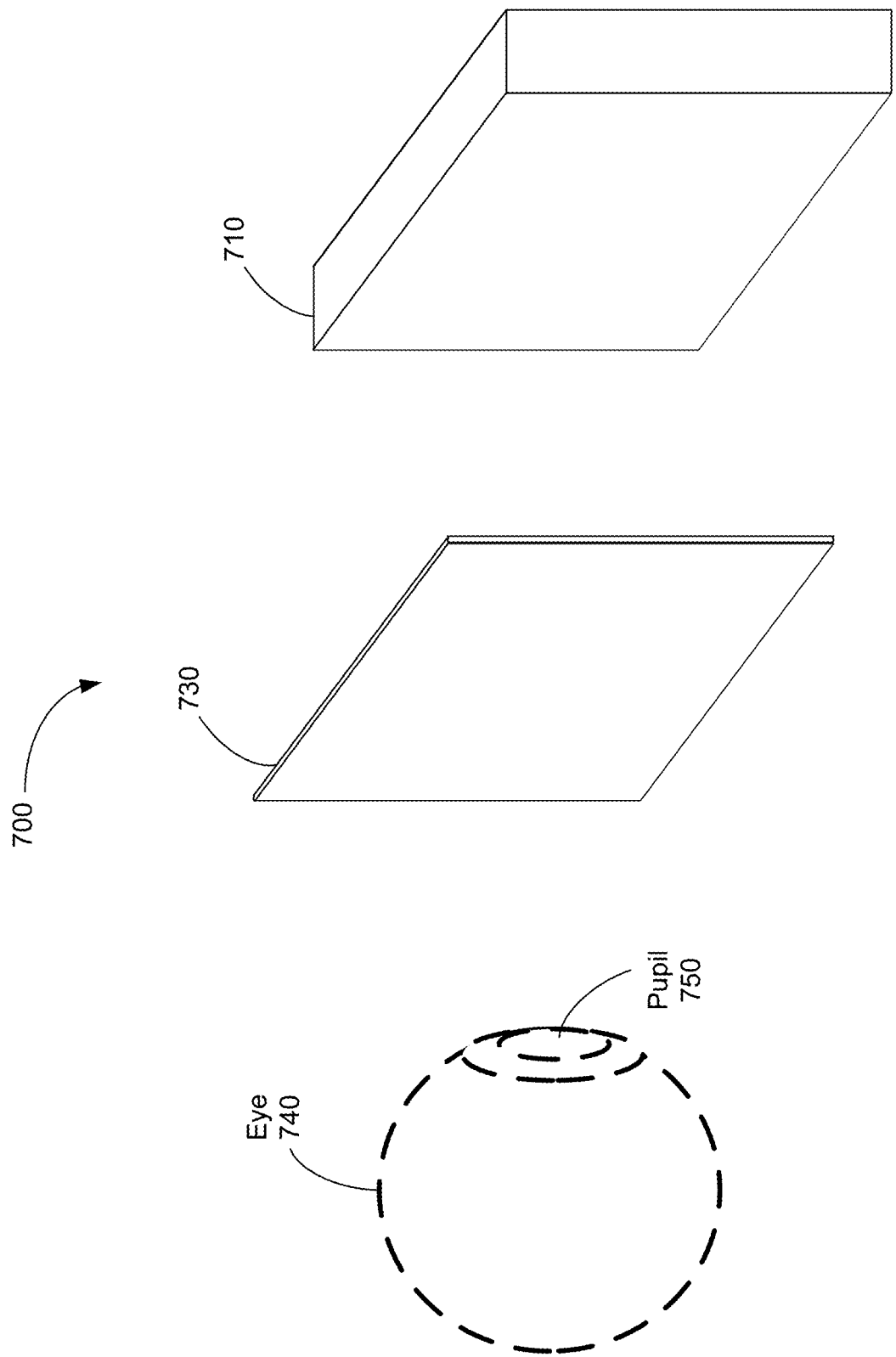
FIG. 7A is an isometric view of a display device in accordance with some embodiments.

FIG. 7A is an isometric view of display device 700 in accordance with some embodiments. In some other embodiments, display device 700 is part of some other electronic display (e.g., a digital microscope, a head-mounted display device, etc.). In some embodiments, display device 700 includes light emission device 710 (e.g., a light emission device array) and an optical assembly 730, which may include one or more lenses and/or other optical components. In some embodiments, optical assembly 730 includes an optical grating having a non-uniform refractive index difference profile, as described herein. In some embodiments, display device 700 also includes an IR detector array.

Light emission device 710 emits image light and optional IR light toward the viewing user. Light emission device 710 includes one or more light emission components that emit light in the visible light (and optionally includes components that emit light in the IR). Light emission device 710 may include, e.g., an array of LEDs, an array of microLEDs, an array of organic LEDs (OLEDs), an array of superluminescent LEDs (sLEDS) or some combination thereof.

In some embodiments, light emission device 710 includes an emission intensity array (e.g., a spatial light modulator) configured to selectively attenuate light emitted from light emission device 710. In some embodiments, the emission intensity array is composed of a plurality of liquid crystal cells or pixels, groups of light emission devices, or some combination thereof. Each of the liquid crystal cells is, or in some embodiments, groups of liquid crystal cells are, addressable to have specific levels of attenuation. For example, at a given time, some of the liquid crystal cells may be set to no attenuation, while other liquid crystal cells may be set to maximum attenuation. In this manner, the emission intensity array is able to provide image light and/or control what portion of the image light is passed to the optical assembly 730. In some embodiments, display device 700 uses the emission intensity array to facilitate providing image light to a location of pupil 750 of eye 740 of a user, and minimize the amount of image light provided to other areas in the eyebox. In some embodiments, display device 700 includes, or is optically coupled with, an optical assembly (e.g., one or more lenses, prisms, mirrors, filters, etc.). In some embodiments, display device 700 is an augmented reality display device. In such embodiments, display device 700 includes, or is optically coupled with, an optical grating having a non-uniform refractive index difference profile, as part of a waveguide-based combiner.

The optical assembly 730 includes one or more lenses. The one or more lenses in optical assembly 730 receive modified image light (e.g., attenuated light) from light emission device 710, and direct the modified image light to a location of pupil 750. The optical assembly 730 may include additional optical components, such as color filters, mirrors, etc. In some embodiments, optical assembly 730 includes an optical grating having a non-uniform refractive index difference profile, as described herein.

An optional IR detector array detects IR light that has been retro-reflected from the retina of eye 740, a cornea of eye 740, a crystalline lens of eye 740, or some combination thereof. The IR detector array includes either a single IR sensor or a plurality of IR sensitive detectors (e.g., photodiodes). In some embodiments, the IR detector array is separate from light emission device 710. In some embodiments, the IR detector array is integrated into light emission device 710.

In some embodiments, light emission device 710 including an emission intensity array make up a display element. Alternatively, the display element includes light emission device 710 (e.g., when light emission device 710 includes individually adjustable pixels) without the emission intensity array. In some embodiments, the display element additionally includes the IR array. In some embodiments, in response to a determined location of pupil 750, the display element adjusts the emitted image light such that the light output by the display element is refracted by one or more lenses toward the determined location of pupil 750, and not toward other locations in the eyebox.

In some embodiments, display device 700 includes one or more broadband sources (e.g., one or more white LEDs) coupled with a plurality of color filters, in addition to, or instead of, light emission device 710.

Figure 7B:
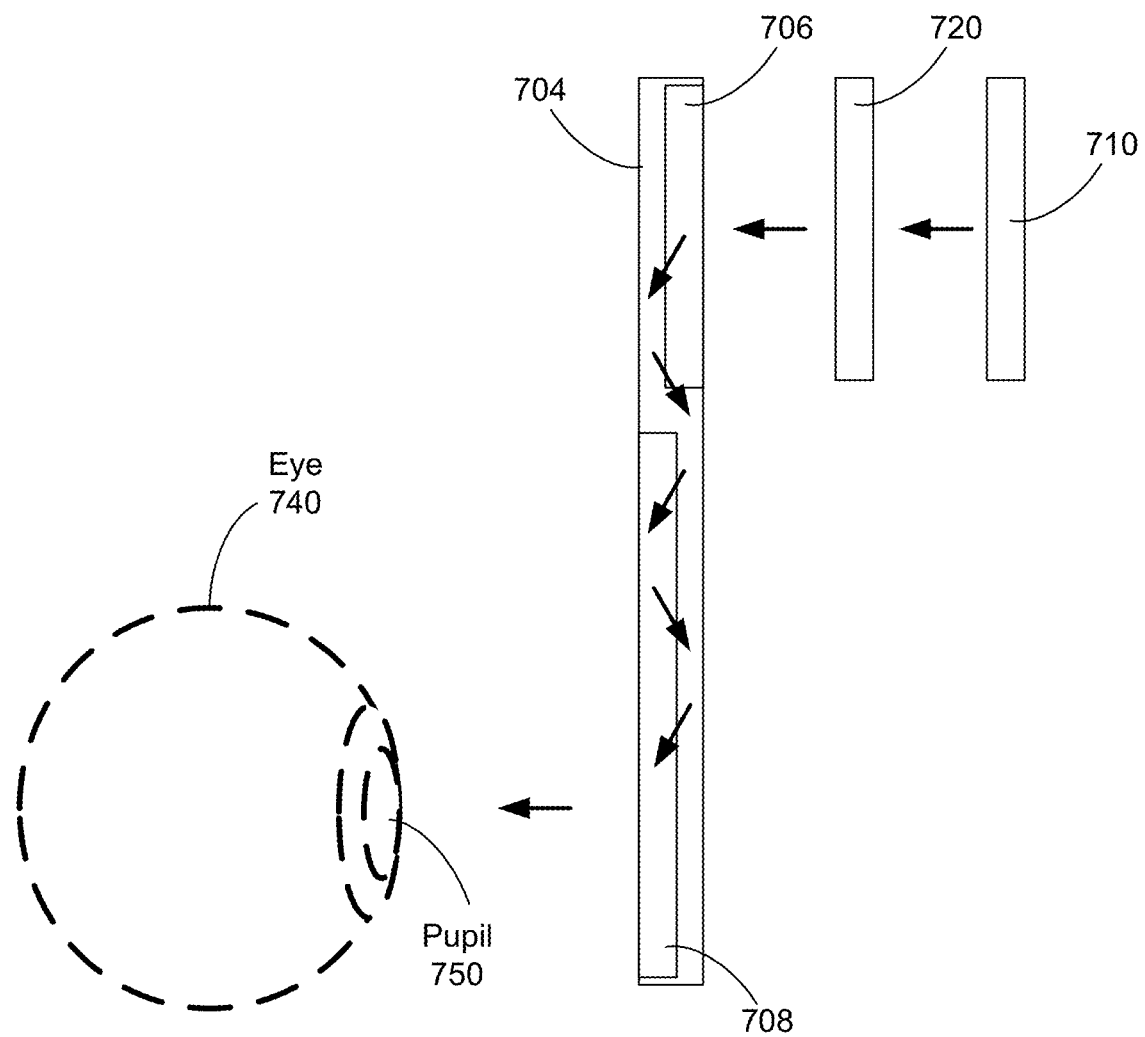
FIG. 7B is a schematic diagram illustrating a display device in accordance with some embodiments.

FIG. 7B is a schematic diagram illustrating a display device in accordance with some embodiments.

The display device includes display 710 for providing an image light, and in some configurations, an optical grating having a non-uniform refractive index difference profile positioned to receive the image light from display 710 and project the image light.

In FIG. 7B, the image light (from display 710) is directed to one or more optics 720 (e.g., lens), and to optical waveguide 704 (which corresponds to optical waveguide 104). The optical waveguide 704 includes optical gratings 706 and 708 for in-coupling and out-coupling of light. Light emitted from the optical waveguide 704 is transmitted toward a pupil 750 of an eye 740.

In some embodiments, the optical gratings 706 and 708 have non-uniform refractive index difference in the thickness direction (e.g., optical gratings have been processed by the methods described herein). Thus, optical gratings 706 and 708 have reduced side peaks in the grating efficiency curve so cross talk between optical gratings 706 and 708 is suppressed, thereby reducing optical artifacts in the projected image.

Although various drawings illustrate operations of particular components or particular groups of components with respect to one eye, a person having ordinary skill in the art would understand that analogous operations can be performed with respect to the other eye or both eyes. For brevity, such details are not repeated herein.

Terms, "and" and "or" as used herein, may include a variety of meanings that are also expected to depend at least in part upon the context in which such terms are used. Typically, "or" if used to associate a list, such as A, B, or C, is intended to mean A, B, and C, here used in the inclusive sense, as well as A, B, or C, here used in the exclusive sense. In addition, the term "one or more" as used herein may be used to describe any feature, structure, or characteristic in the singular or may be used to describe some combination of features, structures, or characteristics. However, it should be noted that this is merely an illustrative example and claimed subject matter is not limited to this example. Furthermore, the term "at least one of" if used to associate a list, such as A, B, or C, can be interpreted to mean any combination of A, B, and/or C, such as A, AB, AC, BC, AA, ABC, AAB, AABBCCC, etc.

The methods, systems, and devices discussed above are examples. Various embodiments may omit, substitute, or add various procedures or components as appropriate. For instance, in alternative configurations, the methods described may be performed in an order different from that described, and/or various stages may be added, omitted, and/or combined. Also, features described with respect to certain embodiments may be combined in various other embodiments. Different aspects and elements of the embodiments may be combined in a similar manner. Also, technology evolves and, thus, many of the elements are examples that do not limit the scope of the disclosure to those specific examples.

Specific details are given in the description to provide a thorough understanding of the embodiments. However, embodiments may be practiced without these specific details. For example, well-known processes, systems, structures, and techniques have been shown without unnecessary detail in order to avoid obscuring the embodiments. This description provides example embodiments only, and is not intended to limit the scope, applicability, or configuration of the invention. Rather, the preceding description of the embodiments will provide those skilled in the art with an enabling description for implementing various embodiments. Various changes may be made in the function and arrangement of elements without departing from the spirit and scope of the present disclosure.

Although some of various drawings illustrate a number of operations in a particular order, operations which are not order dependent may be reordered and other operations may be combined or broken out. While some reordering or other groupings are specifically mentioned, others will be apparent to those of ordinary skill in the art, so the ordering and groupings presented herein are not an exhaustive list of alternatives.

It will also be understood that, although the terms first, second, etc. are, in some instances, used herein to describe various elements, these elements should not be limited by these terms. These terms are used only to distinguish one element from another. For example, a first Fresnel structure could be termed a second Fresnel structure, and, similarly, a second Fresnel structure could be termed a first Fresnel structure, without departing from the scope of the various described embodiments. The first Fresnel structure and the second Fresnel structure are both Fresnel structures, but they are not the same Fresnel structure. Similarly, a first width could be termed a second width, and, similarly, a second width could be termed a first width, without departing from the scope of the various described embodiments. The first width and the second width are both widths, but they are not the same width.

The terminology used in the description of the various described embodiments herein is for the purpose of describing particular embodiments only and is not intended to be limiting. As used in the description of the various described embodiments and the appended claims, the singular forms "a," "an," and "the" are intended to include the plural forms as well, unless the context clearly indicates otherwise. It will also be understood that the term "and/or" as used herein refers to and encompasses any and all possible combinations of one or more of the associated listed items. It will be further understood that the terms "includes," "including," "comprises," and/or "comprising," when used in this specification, specify the presence of stated features, integers, steps, operations, elements, and/or components, but do not preclude the presence or addition of one or more other features, integers, steps, operations, elements, components, and/or groups thereof. The term "exemplary" is used herein in the sense of "serving as an example, instance, or illustration" and not in the sense of "representing the best of its kind."

The foregoing description, for purpose of explanation, has been described with reference to specific embodiments. However, the illustrative discussions above are not intended to be exhaustive or to limit the scope of the claims to the precise forms disclosed. Many modifications and variations are possible in view of the above teachings. The embodiments were chosen in order to best explain the principles underlying the claims and their practical applications, to thereby enable others skilled in the art to best use the embodiments with various modifications as are suited to the particular uses contemplated.

What is claimed is:

1. A method, comprising:
making an optical grating having a non-uniform refractive index profile along a direction substantially perpendicular to a plane defined by the optical grating, including placing a layer of photopolymerization material having a first surface and a second surface that is opposite to the first surface between a first material transfer layer and a second material transfer layer so that the first surface of the layer of photopolymerization material is in contact with the first material transfer layer and the second surface of the layer of photopolymerization material is in contact with the second material transfer layer to allow material transfer between the layer of photopolymerization material and the first and second material transfer layers by diffusion;
removing the first material transfer layer and the second material transfer layer from the layer of photopolymerization material; and
exposing the layer of photopolymerization material to two beams after removing the first material transfer layer and the second material transfer layer from the layer of photopolymerization material.

2. The method of claim 1, further comprising:
exposing the layer of photopolymerization material to two beams that overlap with each other over at least a portion of the layer of photopolymerization material to form a volume hologram.

3. The method of claim 1, further comprising:
polymerizing the layer of photopolymerization material.

4. The method of claim 1, wherein:
the first material transfer layer and the second material transfer layer include polymerization inhibitors so that the polymerization inhibitors are transferred into the layer of photopolymerization material by diffusion; and
the layer of photopolymerization material is placed between the first material transfer layer and the second material transfer layer before exposing the layer of photopolymerization material to two beams that overlap with each other over at least a portion of the layer of photopolymerization material to form a volume hologram.

5. The method of claim 4, wherein:
the polymerization inhibitors include one or more of: phenols, nitroxides, benzoquinones, or nitrosos.

6. The method of claim 4, further comprising:
polymerizing the layer of photopolymerization material after exposing the layer of photopolymerization material to the two beams.

7. The method of claim 1, wherein:
the first material transfer layer and the second material transfer layer include absorptive material so that one or more components of the layer of photopolymerization material are transferred to the first material transfer layer and the second material transfer layer by diffusion.

8. The method of claim 7, further comprising:
exposing the layer of photopolymerization material to two beams that overlap with each other over at least a portion of the layer of photopolymerization material to form a volume hologram.

9. The method of claim 8, wherein:
the layer of photopolymerization material is placed between the first material transfer layer and the second material transfer layer before exposing the layer of photopolymerization material to the two beams.

10. The method of claim 8, wherein:
the layer of photopolymerization material is placed between the first material transfer layer and the second material transfer layer after exposing the layer of photopolymerization material to the two beams.

11. The method of claim 8, further comprising:
exposing the first surface and the second surface of the layer of photopolymerization material to light before exposing the layer of photopolymerization material to the two beams.

12. The method of claim 8, further comprising:
polymerizing the layer of photopolymerization material after exposing the layer of photopolymerization material to the two beams.

13. The method of claim 8, wherein the absorptive material includes one or more of:
polyurethanes, polysiloxanes, thiol-enes, thiol-ynes, or ring opening metathesis polymers (ROMP).

14. The method of claim 1, wherein:
the first material transfer layer and the second material transfer layer include a compound having a refractive index that is distinct from a refractive index of the layer of photopolymerization material so that the compound having a predefined refractive index is transferred to the layer of photopolymerization material by diffusion.

15. The method of claim 14, wherein:
the refractive index of the compound is higher than the refractive index of the layer of photopolymerization material.

16. The method of claim 15, wherein:
the compound includes one or more selected from the group consisting of:
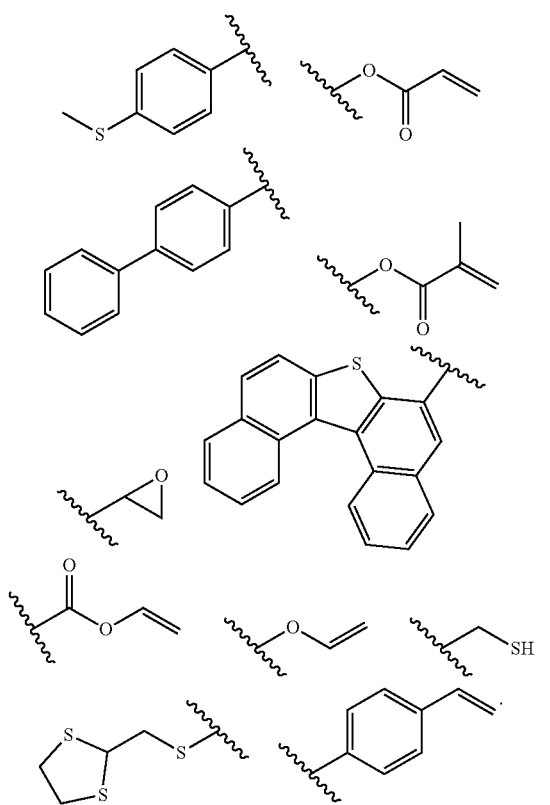
17. The method of claim 14, wherein:
the refractive index of the compound is lower than the refractive index of the layer of photopolymerization material.
18. The method of claim 17, wherein:
the compound includes one or more selected from the group consisting of:
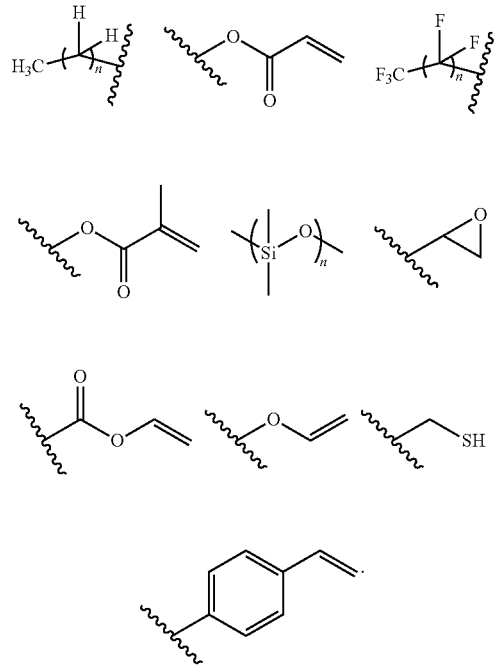
* * * * *